United States Patent [19]
Chow et al.

[11] Patent Number: 5,875,334
[45] Date of Patent: *Feb. 23, 1999

[54] SYSTEM, METHOD, AND PROGRAM FOR EXTENDING A SQL COMPILER FOR HANDLING CONTROL STATEMENTS PACKAGED WITH SQL QUERY STATEMENTS

[75] Inventors: Jyh-Herng Chow; You-Chin (Gene) Fuh; Nelson Mendonca Mattos; Brian T. Tran, all of San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 548,969

[22] Filed: Oct. 27, 1995

[51] Int. Cl.⁶ ...................................................... G06F 9/45
[52] U.S. Cl. .............................................................. 395/705
[58] Field of Search ................................ 395/705; 707/4

[56] References Cited

U.S. PATENT DOCUMENTS

| | | | |
|---|---|---|---|
| 5,201,046 | 4/1993 | Goldberg et al. | 707/100 |
| 5,291,582 | 3/1994 | Bapat | 395/500 |
| 5,432,930 | 7/1995 | Song | 707/4 |
| 5,487,132 | 1/1996 | Cheng | 395/63 |
| 5,546,570 | 8/1996 | McPherson, Jr. et al. | 707/4 |
| 5,617,567 | 4/1997 | Doktor | 395/602 |
| 5,675,804 | 10/1997 | Sidik et al. | 395/705 |

Primary Examiner—James P. Trammell
Assistant Examiner—John Q. Chavis
Attorney, Agent, or Firm—Marilyn Smith Dawkins

[57] ABSTRACT

This invention provides an integrated compiler for compiling SQL3 control statements having procedural, i.e., control, information packaged together with query, i.e., non-procedural, statements. A query extractor contained within the parser extracts the query statement from the control statement leaving a control skeleton. The query statement is processed as usual through a query compiler for generating executable plans with the exception that the name resolution function for resolving variables is modified for looking up local variables. This modification takes into account the mapping of local and host variables to create a unification of local and host variables. The control skeleton is processed through a control analyzer which generates a representation of the control flow and a scope and symbol table. The control analyzer also unifies the local and host variables. A plan synthesizer then takes as input the control flow information, symbol tables, and individual executable plans for the query statements and generates a meta-plan comprising a merger of a top level plan for the control skeleton and sub-plans representing the executable plans of the query statement. Therefore, this invention provides a uniform way of treating local and host variables, provides an efficient way of performing bind-in/bind-out processes, creates a single execution plan requiring only a single run-time interpreter, and requires minimum enhancements to existing SQL2 compilers. In addition, this invention enables the application of global optimization techniques for optimizing both the control aspects and query aspects of the original control statement.

51 Claims, 16 Drawing Sheets

| 233 | 234 | 235 | 236 | 237 | 238 | 239 |
|---|---|---|---|---|---|---|
| SQLRI_STUB | Jmp Fwd Pointer | Plan Pointer | Plan Length | # of In Var | # of Out Var | Offset to In SQLDA | Offset to Out SQLDA |

| In Var #1 Offset | ... | In Var #n Offset | Out Var #1 Offset | ... | Out Var #m Offset |
|---|---|---|---|---|---|

243    253

SYSTEM, METHOD, AND PROGRAM FOR EXTENDING A SQL COMPILER FOR HANDLING CONTROL STATEMENTS PACKAGED WITH SQL QUERY STATEMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to systems, methods, and computer programs in the field of database information processing, and more specifically to database management systems including compilers for compiling program code including query statements packaged with control or procedural statements.

2. Description of the Related Art

The Structured Query Language (SQL) has been widely used in many relational database systems as a database language to define and manipulate databases. Some of these database systems include IBM DB2/CS, Oracle 7, Sybase Server System 10, and Informix Online Dynamic Server. (See, DATABASE 2 AIX/6000 and DATABASE 2 OS/2 SQL Reference, IBM Corporation, First Edition, October 1993; Database 2 Programming Functional Specification, IBM Corporation, Version 2.1. P481–0021, August 1994; Oracle 7 Server Application Developer's Guide, Oracle Corporation, December 1992, Part: 6695-70-0212; TRANSAC-SQL User Guide, Sybase, 1993; The INFORMIX Guide to SQL: Syntax, V.6.0, Informix, March 1994, Part 000-7597; Jim Melton, editor, (ISO-ANSI Working Draft) Database Language (SQL2), International Organization for Standardization and American National Standards Institute, 1992.)

In such systems, access of data from an application program is achieved by means of embedded SQL statements. SQL can be viewed as consisting of two main components: Data Definition Language (DDL) that defines a database, and Data Manipulation Language (DML) that manipulates and accesses data in a database. With embedded SQL statements, application programs can insert a new row into a table, delete rows from a table, update rows from a table, and selectively retrieve rows from a table. The current SQL language standard is known informally as SQL/92 or SQL2. The SQL statements embedded in an application program are translated by the host language pre-processor into invocations to certain APIs. However, SQL2 does not provide any mechanism for expressing program logic and control flow. Instead, the control flow of the application logic is written in the host language. Thus, SQL has been mainly used exclusively for database related services, and has been mostly used as an embedded language in application programs (written in C, COBOL, FORTRAN, etc.) where the host language provides the needed control logic of an application.

Since each SQL statement is compiled into an API call to database server routines executed by the server, and the result is sent back to the application program, frequent communication and data transfer between the client and the server results in low performance. The current trend is to push more logic into the server side, so that the client application can get back only the data it really needs.

The upcoming SQL3 standard (See, Jim Melton, editor, (ISO-ANSI Working Draft) Database Language (SQL3), International Organization for Standardization and American National Standards Institute, August 1994) has defined a procedural extension to the existing SQL2 language. The SQL3 standard has included a new set of statements, called control statements (also referred to herein as procedural statements or procedural constructs), that allow control logic to be incorporated into an SQL statement. The purpose is to make SQL a more computationally-complete language so that computations which have no direct impact on the client side can be moved to the server side to reduce the amount of data transferred between the server and the application. As a consequence, significant performance improvement can be achieved. With SQL3, control logic that used to be expressed only in a host language can now be packaged with query statements to be serviced by the server in a single dialog. The inclusion of these new control statements greatly enhances the expressiveness of the language and enables various programming techniques that used to rely on host languages.

The SQL3 control statements include IF statements, LOOP statements, WHILE statements, REPEAT statements, SET (assignment) statements, and compound statements. The compound statement creates a new scope and allows local variable declarations.

There are four different program contexts where these SQL3 control statements can be used to improve performance of the application program and the functionality provided by the database engine: (1) as an embedded segment of the host program; (2) as the function body of a user-defined function (DB2/CS V2 SQL Referenced); (3) as the body of a stored procedure, and (4) as the body of a trigger (See, Database 2 Programming Functional Specification, IBM Corporation, Version 2.1. P481-0021, August 1994). These four program contexts are discussed in more detail as follows.

1. Embedded in Host Program

Like ordinary query statements, SQL3 control statements can be embedded in the application program using the "EXEC SQL" keywords, as shown below.

```
main( )
{
    . . .
    /* Get trading information: performed by the host
        program. */
    . . .
    /* Update database: performed by the control
        statement. */
    EXEC SQL
        BEGIN
            DECLARE company_id        INTEGER;
        /* Look up the unique ID by name. */
        SELECT id INTO company_id FROM company
                WHERE strcmp(name, :company_name) = 0;
        /* Insert current trading information. */
        INSERT INTO tradings VALUES
                (id, :trading_type, :trading_time,
                    :unit_price, :total_shares);
        /* Update the selling or buying price. */
        IF (:trading_type = 0) THEN
            UPDATE stock SET selling_price =
                :unit_price WHERE id = company_id;
        ELSEIF (:trading_type = 1) THEN
            UPDATE stock SET buying price =
                :unit_price WHERE id = company_id;
```

```
    END IF;
  END;
  /* Host program continues here. */
    ...
}
```

In the example shown above, a compound statement, BEGIN . . . END, is embedded in the host program, following the code which acquires the current trading information from the trading market. This compound statement inserts the current trading information into the tradings table and, depending on the trading_type, it updates the selling_price column or the buying_price column of the corresponding row of the stock table. Since the compound statement is executed entirely on the server side, all the query statements (SELECT, INSERT, and UPDATE) it contains will be serviced in a single communication between the client program and the database server. Such a database access scenario could have taken three communications to complete if it were programmed without using the compound statement.

As demonstrated by this example, there are three advantages provided by the SQL3 control statements. First, in general, the number of communications between the client and the server are reduced by packaging related database access operations with control statements. Therefore, performance of the application program is significantly improved, especially in the environment where communication cost is significant (e.g. multi-media applications with a remote database server). Second, unnecessary bind-in and bind-out is avoided if the output of one query statement is used only as the input to another query statement. Third, readability of the application program is also improved because related database access operations can be packaged into one single SQL statement.

2. User-Defined Function

Control statements are also useful in composing the function body of a user-defined function. For example, the database access session as shown in the previous subsection can be modified and packaged as a user-defined function.

```
CREATE FUNCTION log_transaction(name CHAR(30), type INTEGER,
time TIME, price FLOAT,
amount INTEGER)
    RETURNS INTEGER
    BEGIN
        DECLARE company_id, delta INTEGER;
        SELECT id INTO company_id FROM company
                WHERE strcmp(company.name, name) = 0;
        INSERT INTO tradings VALUES(company_id, type, time,
                                    price, amount);
        IF (type = 0) THEN
            SET delta = price - SELECT buying_price FROM
                stock WHERE id = company_id;
            UPDATE stock SET buying price = price WHERE id
                                          = company id;
        ELSEIF (type = 1) THEN
            SET delta = price - SELECT selling_price FROM
                stock WHERE id = company_id;
            UPDATE stock SET selling_price = price WHERE
                id = company_id;
        END IF;
        RETURN delta;
END;
```

The user-defined function log_transaction takes all the trading information as input, performs the same tasks as the previous example, and returns the unique ID of the company which issues the stock being traded. This user-defined function can now be invoked to log a particular transaction.

```
EXEC SQL
    INSERT    :company_name, :time, log_transaction(:company_name,
                :trading_type, :time, :unit_price, :total_shares)
    INTO      price_trace;
```

3. Stored Procedure

Similarly, the user-defined function shown in the previous sub-section can be turned into a stored procedure. A stored procedure is basically a precompiled program that is stored at the server site (and is known to the server). It is invoked from the client by a remote procedure call (RPC). The number of messages between client and server can be reduced if the system provides a stored procedure mechanism.

```
CREATE PROCEDURE log_transaction(name CHAR(30), type
                                            INTEGER, time TIME,
                                            price FLOAT,
BEGIN
    DECLARE company_id      INTEGER;
    SELECT id INTO company_id FROM company
            WHERE strcmp(company.name, :company_name)= 0;
    INSERT INTO tradings VALUES(id, type, time, price,
                                amount);
    IF (type = 0) THEN
        UPDATE stock SET buying_price = price WHERE id
                                      = company_id;
    ELSEIF (type = 1) THEN
        UPDATE stock SET selling_price = price WHERE
                         id = company_id;
    END IF;
END;
```

The stored procedure log_transaction takes all the trading information as input and performs the tasks similar to that of the previous example. This stored procedure can now be invoked to log a particular transaction.

```
EXEC SQL CALL log_transaction(:company_name,
                              :trading_type, :time,
                              :unit_price,
              :total_shares);
```

4. Trigger

Control statements are also very useful in writing the trigger body of a trigger. A triggered procedure is a procedure that is to be invoked when a specified trigger condition occurs. For example, the following trigger can be created on the stock trading table.

```
CREATE TRIGGER trade_trigger AFTER INSERT ON tradings
    REFERENCING NEW as new_record
    FOR EACH ROW MODE DB2SQL
        BEGIN
            DECLARE day_high_value, day_low_value   DOUBLE;
            /* Look up day_high and day_low. */
            SELECT day_high, day_low INTO day_high_value,
                                          day_low_value
                    FROM daily_trade_record
                        WHERE id = new_record.id;
            /* Update the daily high record if this is
                the new high record. */
            IF (new_record.trading_price > day_high_value) THEN
                UPDATE daily_trade_record SET day_high =
                    new_record.trading_price
                        WHERE id = new_record.id;
            /* Update the daily low record if this is
the new low record. */
            IF (new_record.trading_price < day_low_value) THEN
```

```
             -continued

UPDATE daily_trade_record SET day_low =
                new_record.trading_price
                    WHERE id = new_record.id;
    END;
```

Now the database will maintain the daily high trading record and the daily low trading record up-to-date whenever a new record is inserted into the tradings table.

```
EXEC SQL INSERT INTO tradings VALUES(:company_id, :type,
                                    current time,
                                    :trading_price,
                                    :amount);
```

As shown by the examples and discussion above, there are several advantages to the procedural extensions of SQL3. The improved performance gains by means of these procedural constructs is highly desired by the application developers. The performance is enhanced by minimizing network communication traffic between a client application and server host. The procedural constructs allow "control abstraction" by grouping SQL statements together procedurally resulting in fewer bind in/bind out processes. Instead of the server handling one SQL statement at a time as for SQL2, SQL3 enables the server to perform global optimization of the query statements. Also, because of SQL3's procedural aspects, SQL3 is now easily adaptable to object extensions since objects also contain methods or procedures. A procedural extension to SQL is a prerequisite to handling objects However, this new extension in SQL3 creates several problems for existing SQL2 compilers. First of all, the bind-in/bind-out process of host variables has to be generalized due to the new statement-grouping mechanisms. Second, local variables which persist in its declaring scope makes data sharable among several query statements. Third, the semantics of the procedural constructs are not expressible in terms of the existing table-oriented abstract representation for SQL2 statements. Fourth, since the purpose of control statements is to improve performance, the resulting execution plan has to be efficient enough to outmatch a similar scenario without control statements. Fifth, existing SQL2 compilers presently provide optimization techniques for just query statements. Global optimization for both procedural and query statements together is a new area. These problems are further discussed as follows.

Host Variable Bind-in/Bind-out

In an SQL-based environment, an SQL statement interacts with the host program by means of a set of host variables. Host variables are made known to the SQL compiler at the early stage of the application preparation-time. A reference to a host variable of certain type in the SQL statement is compiled into a plan object (run-time object) of the corresponding SQL type. Host variables could be used for the application to provide data to the database server (input host variable) or to receive data from the database server (output host variable), depending on the context where the host variable appears in the SQL statement. The same host variable can have multiple occurrences in an SQL statement, as an input host variable, an output host variable, or both. At run-time, all the input host variables are packed into a variable-length structure, input SQLDA, that is transferred to the database engine as input parameters to the execution plan of the corresponding SQL statement. The very first action taking place in the execution plan is to convert the data contained in the input SQLDA to the corresponding plan objects which are directly accessed by the execution plan. Such a process is usually referred to as bind-in process. Similarly, for output host variables, there is a bind-out process taking place at the end of the execution plan to convert the plan objects to their corresponding SQLDA entries.

In SQL2, the mapping from SQLDA entries to the corresponding plan objects is simple. For example, the n-th SQLDA entry corresponds to the n-th host variable occurrence in the SQL statement. However, such a simple mapping no longer works for a SQL3 control statement because there can be more than one SQL statement embedded in a control statement. As a result, there can be multiple orders of host variables such that the order of host variable occurrences in one statement does not necessarily agree with that of the statements. Also, there may be sharing of host variables among the statements such that one host variable may be an output variable in one statement, but an input variable in a subsequent statement. This problem did not occur in SQL2 since the server was only handling one SQL statement at a time.

Handling Local Variables

Local variables are new SQL objects introduced in the SQL3 standard. Unlike column objects, the same local variable is accessible in multiple SQL statements. Besides, local variables are associated with a scope where they are defined. Therefore, a local variable of an inner scope will make another local variable with the same name in an outer scope invisible from the inner scope. Similarly to host variables having multiple orders, local variables can have nested scopes. Also similar to the problem with host variables, local variables can be shared among the multiple statements. How to handle local variables at run-time as well as compile-time becomes a new issue to the existing SQL2 compiler.

Representation of Control Statements

The current compiler infrastructure, which is designed to facilitate query processing, is not suitable to deal with these control statements. For example, QGM (query graph model) is the graph representation model used in DB2/CS V2 (IBM DB2/Client Server Version 2). Although QGM has been proven to be very powerful and effective for describing table transformations for a given SQL data statement, it is quite unnatural to describe control flow that has nothing to do with tables.

QGM is powerful in representing query statements whose semantics can be directly mapped into a table transformation function. However, SQL3 control statements neither operate on tables nor generate tables. It is very difficult, if not impossible, to represent all the control statements in terms of table transformation functions. Besides, representing control statements in the format of QGM may lead to one of the two consequences: 1) each phase of the compiler has to be enhanced to eliminate the overhead introduced at the first place, or 2) the overhead will stay in QGM and eventually show up in the execution plan. Neither case is favorable, if there is a simpler solution. Therefore, how to come up with a systematic way of representing procedural constructs without losing the advantage of QGM becomes a challenge to the design of a new compiler.

Performance of the Execution Plans

One of the goals of using control statements is to improve the run-time performance of an application, a user-defined function, a stored procedure, or a trigger. Therefore, the resulting execution plan has to be efficient enough to outmatch the same scenario without using control statements.

As an example, the user-defined function given above should have better performance than an equivalent one written in an external language such as C.

Presently, the SQL2 compilers today perform optimization techniques for query statements only, and not for procedural statements. Separately, there are also optimization techniques for procedural languages, but the optimization techniques are not applicable for query statements. However, with a control statement there is an interplay between query statements and procedural statements whereby both, together, could be made more efficient by global optimization. Global optimization is a new issue that has been introduced with control statements. It is presently unknown how to do control flow optimization in conjunction with query optimization.

There exists today systems that are capable of handling SQL3-like control statements having a procedural and non-procedural part. However, there are problems associated with the present day approaches. For example, one approach is to represent the procedural constructs as table functions in order to utilize, intact, an SQL2 query compiler. This approach is used in IBM DB2/CS Trigger. However, it is very difficult and unnatural to represent procedural constructs as table functions, and redundancy will be introduced. There is much difficulty in teaching a compiler to recognize the difference between a real SELECT statement and a SELECT statement that is being used somehow to represent the control flow of a procedure statement. Other problems with this approach include the significant impact on the existing query compiler, the difficulty in preserving the statement boundary, the difficulty in preserving the control flow information, and the difficulty in removing the redundancy introduced in the first place. Another approach, used by Oracle and Sybase, treats the procedural extension as a server-side host language. Since the procedural and non-procedural part of the statement is compiled in two totally different environments that do not talk to each other, it is very difficult, if not impossible, to perform global optimization on the query statements. Other difficulties include the significant communication overhead with the SQL interpreter, significant overhead due to data movement, and duplicate effort for the procedural engine and the host language pre-processor.

SUMMARY OF THE INVENTION

It is an object of this invention to compile query statements and control statements of SQL3 while still enabling and enhancing the benefits of procedural constructs such as performance, control abstraction, global optimization and the generation of efficient executable plans.

The system, method, and program of this invention enables an existing SQL query compiler to compile SQL control statements. Given the very different nature of query statements and control statements, the present invention does not modify the existing infrastructure of SQL query compilers in order to accommodate control statements. Instead, the compilation of control statements is separated from the compilation of data statements, where the later can be best compiled by the existing query compiler with minimal modification. In particular, data statements that occur inside a control statement are extracted and compiled by the existing SQL query compiler, while the control statement, after data statements have been extracted, becomes only a control skeleton that will be compiled into a meta-plan that glues together all the sub-plans of extracted data statements.

The system of this invention has an integrated compiler having two components, a control analyzer and a query optimizer, for compiling the procedural and non-procedural part of the control statement. The control analyzer is specialized for compiling the procedural part. The query optimizer is essentially the same existing query compiler for compiling the non-procedural part. One single executable plan is generated requiring only a single run-time interpreter.

More specifically, the parser of the original query compiler is used to separate out the query statements from the control statement thereby creating a control skeleton having only the procedural aspects of the statement. The control skeleton (procedural part) and the extracted query statement (non-procedural part) are fed back into the parser. The extracted query statement is optimized using the original query compiler including, after the parser, global semantic checking (by the query global semantics as in the DB2 CS query compiler), query rewrite (including the query graphical model), optimization, code generation, and plan generation (access section). The control skeleton (procedural part) is fed back through the original parser. Then, a control analyzer analyzes the control flow, and generates an internal representation (procedure graphical model, PGM) for the control flow. The PGM records the control flow information found in the control skeleton. The control analyzer also generates a scopes and symbol table from the control skeleton which is used during this compile process. The scope and symbol table resolves the local variables declared inside a compound statement used to create a scope. All statements embedded in the scope will see the local variables. The sub plans (access section) generated from the query statement (non-procedural part) are merged together with the plans of the procedural part into a single meta-plan by a plan synthesizer.

There are several advantages of this invention. First, there is minimum enhancement of the query compiler. Since the "control skeleton" does not go through the normal compilation path, the query compiler can be left un-touched and continues focusing on the query-specific processing (optimization, code-generation, etc). Second, the invention is extensible in that it facilitates the addition of new functions. Since it is very straightforward to process the "control skeleton", adding new procedural constructs becomes possible. Third, the invention enables an efficient execution plan. Since the "control skeleton" is not represented in the table-oriented QGM, redundancy caused by the mapping from procedural semantics to declarative semantics is avoided. As a result, a more efficient plan can be generated without special treatment. The threaded code generated by the compiler is compact and efficient. Fourth, the invention facilitates the adoption of global optimization technology. Compiler optimization techniques for procedural languages (e.g. C, Fortran, etc.) can be applied to the "control skeleton" where embedded SQL2 statements are treated as a black box with certain characteristics. Fifth, the invention is relatively easy to implement and has a minimum impact on the existing query compiler. No duplicate effort is undertaken by the compiler in compiling the procedural and non-procedural parts of the control statements.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
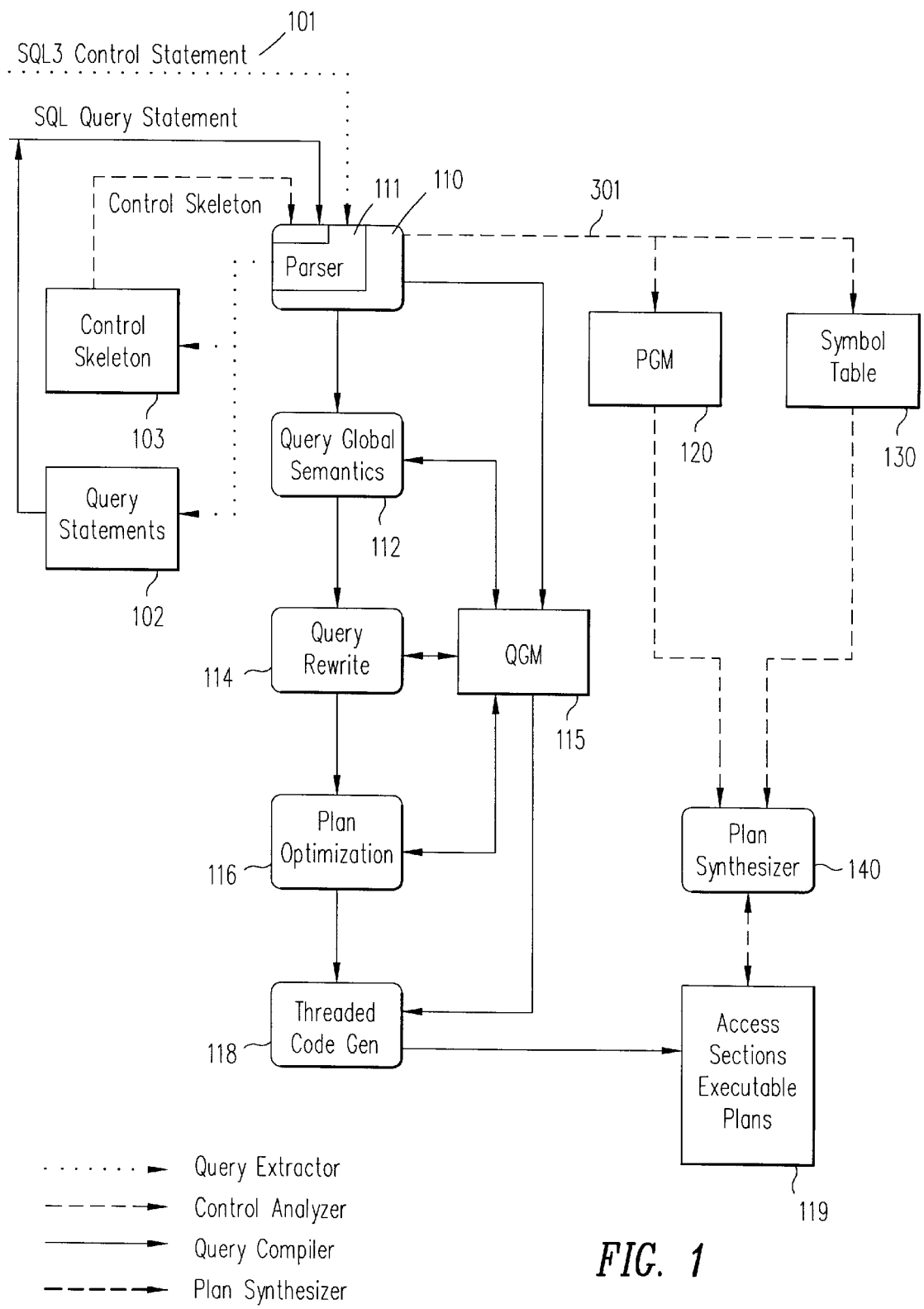
FIG. 1 is a block diagram of a compiler of this invention showing the compilation path of a control statement after being separated into a procedural part and a non-procedural part including a path through an original SQL2 query compiler for compiling executable plans for the non-procedural part of a control statement and a path through a control analyzer for the procedural part of the control statement and a plan synthesizer for combining the plans generated from the two paths.

In DB2/CS V2 query compiler, most SQL statements are parsed into an intermediate representation called Query Graph Model (QGM). A QGM unit is a directed graph (although it could be cyclic due to recursive queries) in which each node represents a table transformation function and each edge flows the rows of the table produced by a predecessor table function into its successor table function. A QGM node without incoming edge represents a constant table function where the output is a constant table (e.g., base table). Once created by the parser, a QGM unit is used as a representation of the original SQL statement in subsequent compiler phases. QGM is a powerful mechanism for representing SQL statements.

SQL3 control statements are essentially "aggregates" which ultimately specify a well-defined execution sequence over a set of SQL2 statements. To be more specific, for instance, the SQL3 WHILE statement defines a conditional repetition of the ordered set of statements which are encapsulated in the loop body. The loop construct is basically a "control skeleton" gluing the embedded statements.

The present invention separates the embedded SQL2 statements of a control statement from its "control skeleton". Each embedded SQL2 statement can be compiled into an execution plan by the existing SQL2 compiler with a minimum enhancement. The minimum enhancement involves extending the QGM (query graph model) with a new set of procedural nodes to accommodate the representation of the control skeleton of SQL3 control statements. The "control skeleton", on the other hand, is translated into a representation by a new compiler component. Finally, the representation of the "control skeleton" is used to synthesize the execution plan of the control statement from those of the embedded SQL2 statements.

The following description of the preferred embodiment of this invention is organized as follows. First, the set of SQL3 control statements and a subset of SQL3 control statements, called SAP, that is used to illustrate the invention, are described. Second, an overview of the invention for compiling these SAP control statements, based on the existing DB2/CS V2 SQL query compiler, is given. Third, the major data structures of the invention are described. Fourth, the technical issues involved in this invention are discussed.

SQL3 Statement Taxonomy

In SQL3 standard, SQL statements are divided into seven different classes as shown in the following syntax rule.

```
<SQL procedure statement> ::=
        <SQL schema statement>
      | <SQL data statement>
      | <SQL transaction statement>
      | <SQL conncetion statement>
      | <SQL session statement>
      | <SQL diagnostics statement>
      | <SQL control statement>
```

The <SQL schema statement> class covers most, if not all, of the DDL statements. It includes the CREATE statements, the DROP statements, the ALTER statements, the GRANT statements, and the REVOKE statements. The <SQL data statement> class covers all of the DML statements such as the OPEN statement, the CLOSE statement, the FETCH statement, the SELECT_SINGLE_ROW statement, the INSERT statement, the DELETE statements, and the UPDATE statements. The next four classes in the syntax diagram covers the transaction-specific statements, the connection-specific statements, the session-specific statements, and the diagnostics-specific statements respectively. The last class, <SQL control statement>, contains a set of procedural statements which provides a way of packaging a group of SQL3 statements. The set of <SQL control statement> is described in more detail as follows.

Control Statements

There are eleven control statements defined in the SQL3 standard. The following syntax diagram shows the list of SQL3 control statements.

```
<SQL control statement> ::=
            <compound statement>
          | <assignment statement>
          | <if statement>
          | <loop statement>
          | <while statement>
          | <repeat statement>
          | <case statement>
          | <return statement>
          | <leave statement>
          | <call statement>
          | <for statement>
```

Compound Statement

A compound statement groups a sequence of <SQL procedure statement> together in a newly created scope. Local variables can be declared in a compound statement and accessed in any statement pertaining to the compound statement. The syntax rule of compound statement is shown as follows:

```
<compound statement> ::=
    [ <beginning_label> <colon> ]
    BEGIN [ [ NOT ] ATOMIC ]
        [ <local_declaration_list> ]
        [ <SQL statement list> ]
    END [ <ending label> ]
<SQL statement list> ::=
    <SQL procedure statement>   <colon> . . .
<local declaration list> ::=
    <local declaration>   <colon> . . .
<local declaration> ::=
    <SQL variable declaration>
  | . . .
<SQL variable declaration> ::=
    DECLARE
    <SQL variable name list>
    [ <constant or updatable> ]
    | <data type> | <domain name> "
    [ <default clause> ]
```

Assignment Statement

An assignment statement assigns the value obtained from its right-hand-side to the target specified by its left-hand-side. The assignment target is an <SQL variable> which is declared by an <SQL variable declaration>. The syntax rule is shown below:

```
<assignment statement> ::=
    SET
        <assignment target>
        <equals operator>
        <assignment source>
<assignment target> ::=
    <component reference>
  | <target specification>
assignment source> ::=
    <value expression>
  | <null specification>
```

If Statement

Like other languages, an IF statement specifies a conditional execution based on the truth value of an SQL <search condition>. The syntax rule is shown below:

```
<if statement> ::=
    IF
    <search condition>
    THEN <SQL statement list>
    [   ELSEIF <search condition> THEN <SQL statement list>   ]
    [   ELSE <SQL statement list>   ]
    END IF
```

Loop Statement

The LOOP statement repeats the execution of a sequence of statements indefinitely. Execution of a LOOP statement terminates when a LEAVE statement is encountered. The syntax rule of LOOP statement is shown below:

```
<loop statement> ::=
    [   <beginning label> <colon>   ]
    LOOP
        <SQL statement list>
    END LOOP {   <ending label>   }
```

While Statement

The WHILE statement repeats the execution of a sequence of statements while the value of an SQL <search condition> is true. If the condition is false before the first iteration, the statements pertaining to the WHILE statement will not be executed. The syntax of WHILE statement is described in the following syntax rule:

```
<while statement> ::=
    [   <beginning label> <colon>   ]
    WHILE <search condition> DO
        <SQL statement list>
    END WHILE [   <ending label>   ]
```

Repeat Statement

The REPEAT statement is similar to the WHILE statement except that the SQL <search condition> is tested at the end of each iteration. Therefore, the pertaining statements will be executed at least once.

```
<repeat statement> ::=
    [   <beginning label> <colon>   ]
    REPEAT
        <SQL statement list>
        UNTIL <search condition>
    END REPEAT [   <ending label>   ]
```

Case Statement

There are two types of CASE statement, <simple case statement> and <searched case statement>. The former defines a conditional execution based on the value of an SQL <value expression> while the latter defines a conditional execution based on the truth value of an SQL <search condition>.

```
<case statement> ::=
    <simple case statement>
  | <searched case statement>
<simple case statement> ::=
    CASE <value expression>
        <simple case statement when clause> . . .
        [   ELSE <SQL statement list>   ]
    END CASE
<simple case statement when clause> ::=
```

-continued

```
        WHEN <value expression> THEN <SQL statement list>
    <searched case statement> ::=
        CASE
            <search case statement when clause> . . .
            [   ELSE <SQL statement list>   ]
        END CASE
    <searched case statement when clause> ::=
        WHEN <search condition> THEN <SQL statement list>
```

Return Statement

The RETURN statement returns a value to the caller of an SQL function. Therefore, it can only appear in the body of an SQL function.

```
    <return statement' ::=
        RETURN <value expression>
```

Leave Statement

The LEAVE statement terminates the execution of the program scope specified by the <statement label> and resumes the execution at the statement immediately following the terminated scope.

```
    <leave statement> ::=
        LEAVE <statement label>
```

Call Statement

The CALL statement invokes an SQL procedure.

```
    <call statement> ::=
        CALL <routine invocation>
```

For Statement

The FOR statement executes a sequence of statements for each row of the table specified by the <cursor specification>. Columns of the table can be accessed by the pertaining statements as if they were local variables whose value is bound to that of the corresponding column.

```
    [   <beginning label> <colon>   ]
    FOR <identifier> AS [   <cursor name>   [   <cursor
sensitivty>   ]   CURSOR FOR   ]
                                      <cursor specification>
        DO <SQL statement list>
        END FOR [   <ending label>   ]
```

A subset (SAP) of the above set of SQL control statements have been used to implement the invention. This subset includes the compound statement, the assignment statement, the IF statement, the LOOP statement, the WHILE statement, and the REPEAT statement.

The following specific terms used herein are defined as follows.

Database Language Statement herein refers to meaning one or more statements grouped together including but not limited to SQL procedural, control, declarative, query, or other kinds of SQL statements as well as other database language statements.

QGM shall mean Query Graph Model, an internal representation for a query statement.

SQLDA shall mean SQL descriptor area. A structure used to pass data to and receive data from the database engine.

Bind-In/Bind-Out shall mean the process whereby the host variables of an application's embedded SQL statements are prepared for runtime access and execution on a database.

Access Section shall mean an execution plan which contains the information needed by the RDS interpreter to perform the query statement request.

RDS shall mean Relational Data System. A component in a Relational database system. This component includes the parser, optimizer and code generation.

TCG shall mean Thread Code Generation.

Threaded Code shall mean the code produced by the compiler to be executed by the RDS interpreter.

The details of the invention are described as follows.

Overview of the SAP Compiler

SQL3 control statements interact with other classes of SQL3 statements in two different ways. First of all, the SQL expression and the SQL search condition can appear as part of the control statement (assignment statement, if statement, while statement, and repeat statement). Second, local variables declared in a compound statement can appear in a non-control statement contained in the body of the compound statement.

Most SQL3 control statements are "procedural" statements in that they define an evaluation order for the execution of the program. Unlike other SQL statements, a control statement does not operate on tables. For example, a compound statement defines a new scope and groups a sequence of statements together and a WHILE statement repeats a sequence of statements based on the value of an SQL search condition.

The present invention generalizes the QGM to accommodate the representation of control statements. The concept of the invention is to separate the "procedural" part from the "declarative" part. For the latter, the original query compiler path is still used to generate an executable plan. However, for the former, a new compilation path is used for the generation of symbol tables and the flow control information. The output produced by the two compilation paths are fed into a new functional component, plan-synthesizer, which synthesizes the final executable plan for the target control statement. The block diagram of the compiler of this invention is shown in FIG. 1.

Pre-processing the Control Statements

As shown in FIG. 1, an SQL3 control statement 101 is first transformed into a SAP skeleton 103 and a set of query statements 102 that can be compiled by the existing query compiler 110, 112, 114, 115, 116, 118, 119. The transformation takes place in the parsing phase 110 of the compiler by the query extractor 111. The SAP skeleton 103 is basically the original control statement with the "declarative" part substituted by a special SQL_STUB token. Part of the query statements produced by the source transformation process are directly extracted from the control statement where they are embedded. Other query statements are generated by the transformer for separating the "procedural" parts of the control statement from the "declarative" parts of the statement. As an example, the transformer will replace the search condition of an IF statement by a compiler-generated integer variable whose value is assigned, in a compiler-generated VALUES INTO statement, to either 1 or 0 depending on the value of the search condition appearing in a case expression.

The Query Extractor and Transformation Rules

The Query Extractor 111 (FIG. 1) involves only the parser 110. The main purpose of Query Extractor 111 is to extract statements that can be processed by the current query compiler into separate compilation units, and, as a result, it produces a SAP skeleton where each extracted statement has been replaced by the keyword SQL_STUB. The extra compilation units are stored in the SAP global data area and will be compiled in the Query Compilation Path by the normal path to obtain access plans.

Conceptually, the query extractor uses three steps in separating the procedural part from the non-procedural part of the control statement, although all three steps are performed on the fly, i.e., in a single parsing phase. First, there is a transformation of a SET statement into a values expression. This is a direct translation from a procedural to a non-procedural statement in a very efficient way. Second, the search condition of a procedural statement is extracted. The search condition can be any SQL condition, even a SELECT statement. The search condition is replaced with a compiler generated local variable. Based on the condition, a 1 or 0, i.e., true or false, is assigned to the variable. The statement then becomes a pure procedural statement. Third, after performing the above two steps, what remains is a control statement having a pure control statement (procedural part) and a pure data statement (non-procedural part). The data statement is then replaced with a place holder, or token, e.g., SQL_STUB. The above three steps are illustrated below:

Transforming set statement

```
SET a = <SQL expression>;
becomes:
    VALUES <SQL expression> INTO a;
-Extracting search condition
    IF <search condition> THEN ... ELSE ... END IF
becomes:
    VALUES (CASE WHEN (<search condition>) 1 ELSE 0) INTO #SAPtmp#
    IF (#SAPtmp#) THEN ... ELSE ... END IF
-Extracting data statement
    IF (<condition>) THEN INSERT INTO t VALUES(a);
              ELSE VALUES a+3 INTO b;
    END IF;
becomes:
    IF (<condition>) THEN SQL_STUB;
              ELSE SQL_STUB;
    END IF:
```

Figure 2:
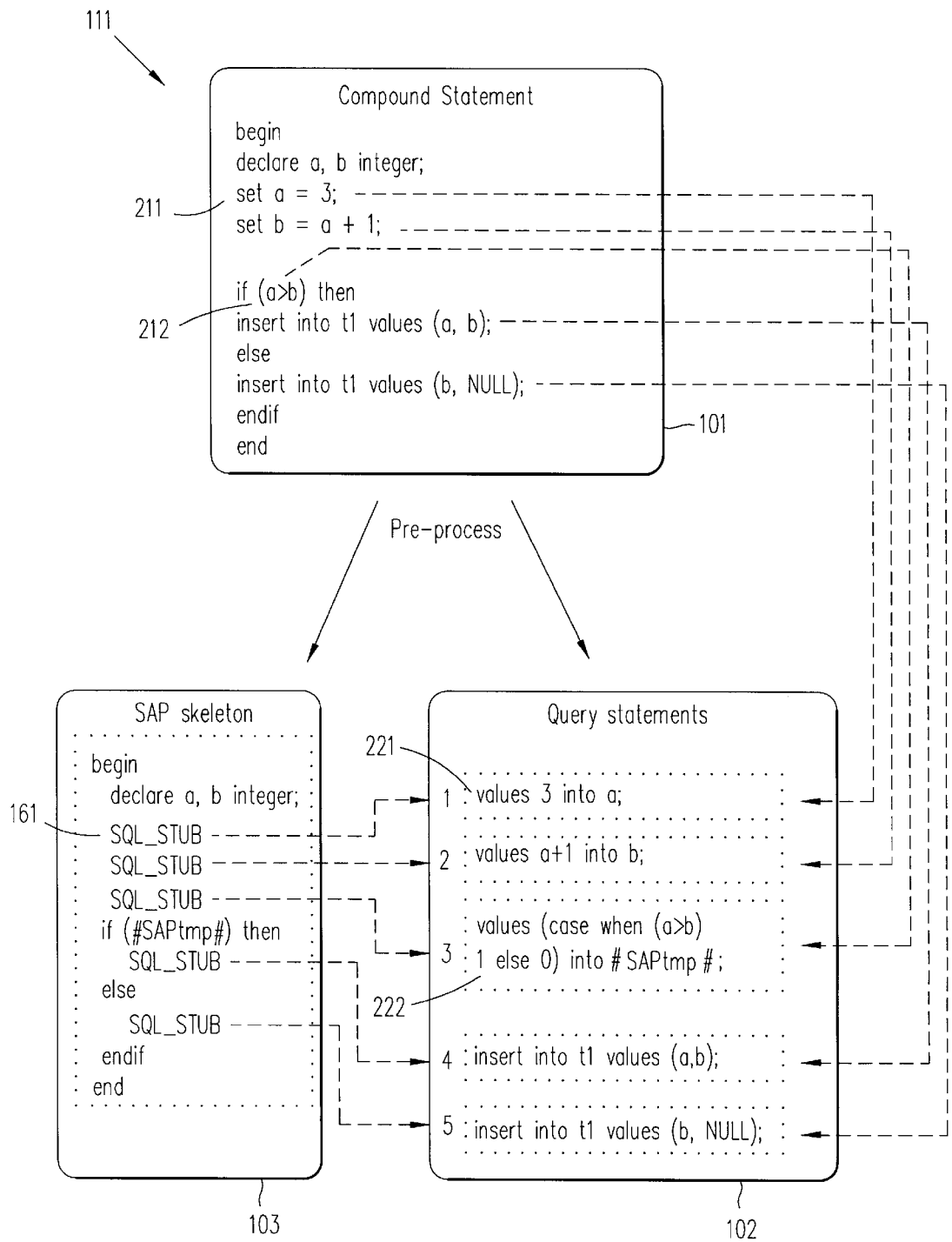
FIG. 2 illustrates transforming, by the Query Extractor, an SQL3 control statement into a SAP skeleton and a set of SQL query statements.

FIG. 2 illustrates such transformations by extracting SQL query statements 102 and producing a SAP skeleton 103. The connections are shown between the original input SQL statement, the SQL_STUBs in SAP skeleton and the extracted query statements. The input control statement 101 is shown at the top. The result of pre-processing is the SAP skeleton 103 shown at the bottom left and a set of extracted SQL query statements 102 shown at the bottom right. Each SET statement 211 has been extracted and converted into a VALUES INTO statement 221, and a SQL_STUB 231 is inserted in the SAP skeleton. We also notice that the search condition a>b of the IF statement 212 is extracted and is replaced by a compiler-generated variable, #SAPtmp#, whose value is set by another VALUES INTO statement 222 indicated by the third query statement.

More specifically, during this phase, the input SAP control statement is parsed, and transformations are applied for the following three productions, each of which results in a separate compilation unit:

SQL statements: these are the statements that can be processed by the current compiler to generate access plans. After this phase, they will be replaced by SQL_STUB.

At the reduction of the rule <SQL_data_stmt>, the text string corresponding to this rule reduction will be saved to the SAP global area as a separate compilation unit, and is physically replaced by the string "SQL_STUB" in the original input SQL string.

SAP SET statement: this is transformed into a value expression, which then becomes an SQL data statement that can be compiled into an access plan as above. The SAP SET statement:

<assignment_stmt> ::= SET <assignment_target> EQUALS_OPERATOR <assignment_source> will be converted into a VALUES statement, the converted string will be saved as a separate compilation unit, and "SQL_STUB" will be inserted in place. The VALUES statement is of the form:

VALUES <assignment_source> INTO <assignment_target>

The target variable of the assignment will be treated in the Query Compilation Path as if it were a reference to a host variable.

SAP conditions in IF, WHILE, and UNTIL: the local temporary variable #SAPtmp# will be generated to store the result of the search condition, treated as if it were a SAP SET statement. The temporary variable is then tested in the condition. As an example:

```
                            VALUES (CASE WHEN (<search condition>)
IF <search condition>           1 ELSE 0) INTO #SAPtmp#;
THEN ...        —>      IF (#SAPtmp#)
  ELSE ...                  THEN ...
END IF                       ELSE ...
                             END IF
```

Note that at most a single temporary variable has to be generated for the whole compilation unit, because once the temporary variable is assigned, its value will be immediately consumed by the following statement and it will become available for next use. Note also that the compiler can always implicitly declare this variable a priori, so a DECLARE statement is not generated for it.

For WHILE statement

```
                VALUES (CASE WHEN (<search
condition>)
WHILE <search conditions> DO 1 ELSE 0) INTO #SAPtmp#;
...           =>      WHILE (#SAPtmp#) DO
END WHILE      ...
                END WHILE
```

Note that this transformation does not seem to generate a semantically equivalent program (the WHILE condition is not re-evaluated); another VALUES clause could have been added to assign #SAPtmp# at the end of the WHILE loop; however, this is not done because later the code synthesizing phase will generate a correct loop that jumps back to the beginning of the VALUES clause.

The REPEAT loop is similar

```
              REPEAT
REPEAT        ...
...       =>  VALUES CASH WHEN (<search condition>)
UNTIL <search condition>   1 ELSE 0) INTO #SAPtmp#;
              UNTIL (#SAPtmp#)
```

Again, these VALUES clauses will be saved in the SAP global area as separate compilation units, and they will be replaced in place by the string "SQL_STUB" in the input SQL string.

Because a SAP compound statement can be nested within another compound statement, each compound statement opens a new scope for the variables in its local declaration list. The correct mapping of local variables and temporary variables to their scopes will be created by the SAP Compilation Path.

After the above extractions, the original input SQL control statement is left with a skeleton of SAP specific control constructs where all SQL data statements that the existing compiler can process have been replaced by SQL_STUB. The skeleton of the original input control statement then will be processed directly by the extended TCG (Threaded Code Generation) to obtain a meta-plan in the Plan Synthesizer. The extensions in TCG to generate threaded code for this skeleton are described further below.

This phase modifies the following data structures:
new keywords in parser, and soft keyword table.
top control blocks, in particular, the number of compilation units sap→no_of_cmpl_unit, the modified original SQL input string sap_cmpl_unit[0], and the saved SQL data statements, sap_cmpl_unit[i], i>0.

The following routines are affected in this phase.
sqlnp_lex.C: Add the following keyword tokens: IF, WHILE, DO, SQL_STUB, LOOP, ELSEIF, LEAVE, RETURN, REPEAT, and UNTIL. And add the corresponding terminal symbols in sqlnp_gram.g.
sqlnp_main.C: After sqlnp_initlex, if sap_phase==1, then call sqlnp_parse with pcb→reor_phase=FALSE, and exit immediately (therefore, no re-ordering and semantic checking of the normal SW parser are called).
sqlnp_gram.g: Add new grammar rules, new tokens for the SQL control statements. Do the transformation for the following cases:
SQLNP_DATA_STMT_RULE (when a <SQL_data_stmt> is parsed): Save the text string in sap_cbp→sap_cmpl_unit.stmt, and put the token SQL_STUB in place.
SQLNP_ASSIGNMENT_STMT_RULE (when a <assignment_statement> is parsed): Convert the string into "VALUES . . . INTO . . . " and save it in sap_cbp→sap_cmpl_unit.stmt and put the token SQL_STUB in place.
SQLNP_FINAL_RULE2 (when a <SQL_procedure_stmt> is parsed): re-construct the statement text based on the token list. Generate the string "SQL_STUB" for each SQL_STUB token.

With the grammar changes, the following include files are modified as usual:
sqlnp_action.h, sqlnp_sym.h, sqlnp_def.h, sqlnp_dcl.h, sqlnp_prs.h, and sqlnp_issoft.h (generated by makesoft).

Compiling the Procedural Part
The Control Analyzer

With Reference to FIG. 1, following the pre-processing phase, the control analyzer 301 takes as input the control skeleton and generates a control flow internal representation which is referenced as PGM 120 which preserves the semantics of the control statement. A scope and corresponding symbol table 130 is also generated when a compound statement is encountered. The control analyzer can perform some control flow and data flow analysis which will assist the query compiler in performing global optimization. The control analyzer will take as input the control flow representation PGM 120 and the scopes and symbol table 130 and feed back information to the original query compiler for the global optimization.

The control analyzer also unifies local variables and host variables in the following way. The control analyzer treats all of the local variables as host variables. Local variables are treated as host variables to minimize the impact on the original query compiler since the original query compiler only handles host variables. As such, the host variable table is populated with local variables, along with the host variables. The query compiler finds the local variable as a host variable. A name resolution function renames the local variable if there is a conflict with a host variable name. Also, the name resolution function of the query compiler is modified so as not to return an error message if a column name is not found for a variable. Instead, it determines a meaning of a local variable by invoking a symbol table look up routine to return a host variable name to the semantic routine of the query compiler.

In addition, host variables are treated internally as local variables having an outer-most scope. Therefore, for each host variable, the outer-most symbol table will be populated. The symbol table is populated during the parsing phase. Therefore, both the symbol table and the host variable table have both local and host variables. Each variable, whether a host variable or local variable, has two entries, one in the symbol table and one in the host variable table. Since two variables in different scopes may have the same name, a renaming scheme is employed to avoid name conflict in the host variable table. A name resolution function is invoked to resolve any conflict between variable names.

As discussed further below, the plan synthesizer uses the symbol table to allocate storage for the variables at code generation time. Since the symbol table has all of the local and host variables, storage for all of the variables will be allocated at this time. The plan synthesizer does not have to go through the host variable table to allocate storage for host variables.

The above unification of host and local variables allows the meta-plan to have a one-time bind-in and a one-time bind-out operation.

Figure 3:
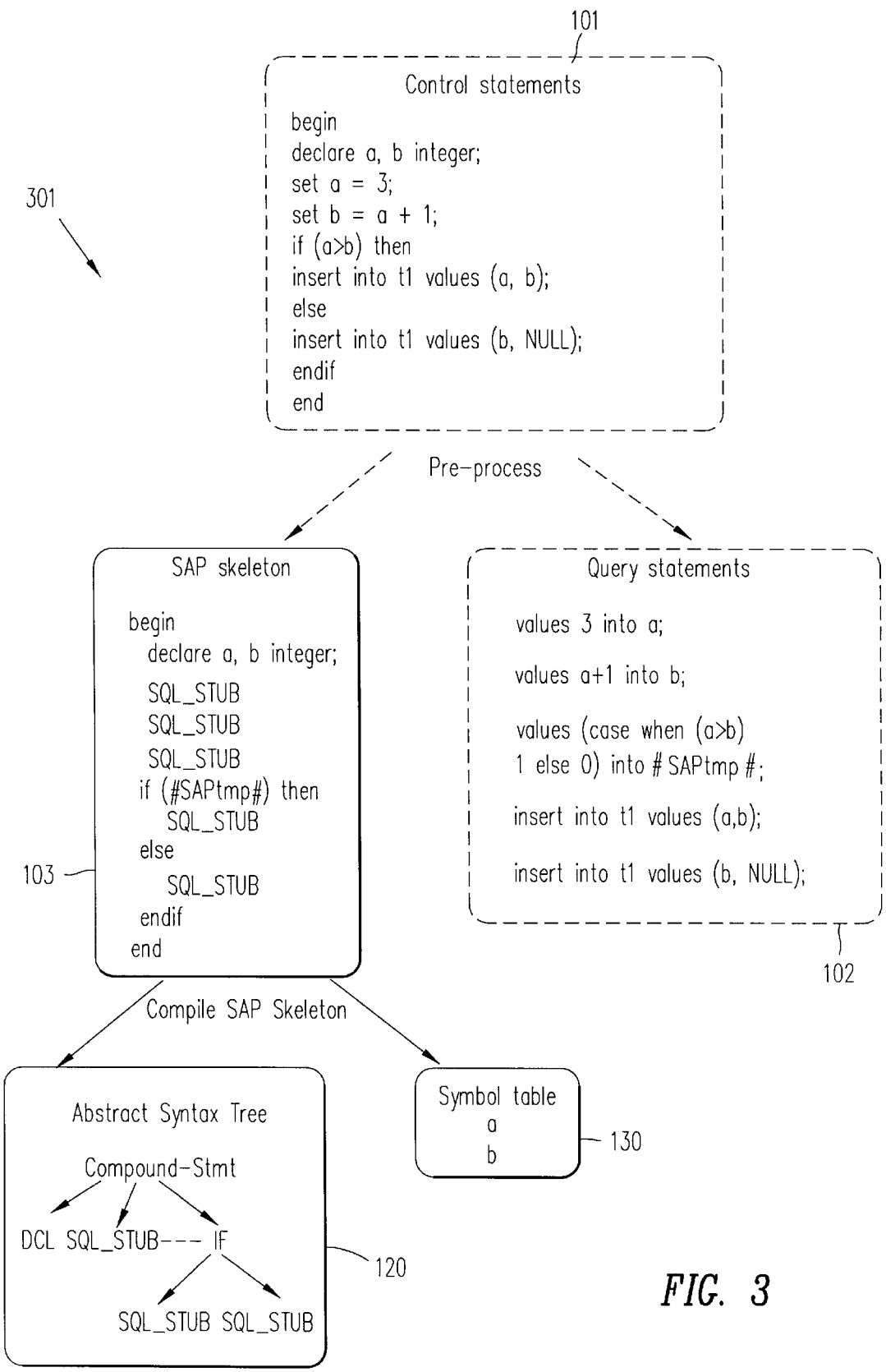
FIG. 3 illustrates the generation of a syntax tree representation and the construction of a symbol table from a SAP skeleton when a compound statement is encountered.

FIG. 3 illustrates the result of this step. A compound statement syntax tree 120 has been created, and variables "a" and "b" are entered in the symbol table 130.

The compiler path for the SAP skeleton for parsing the control constructs is described as follows.

This phase parses the statement text of SAP skeleton (i.e., in sap_cmpl_unit[0] generated by the Query Extractor, constructs the syntax tree (AST) for the SAP control statement and creates symbol tables that support scoping and relate local variables to host variables. The syntax tree and the symbol table will then be used to generate a meta access plan in plan-synthesizer. Again, this phase involves the parser only.

To illustrate scopes and symbol tables, consider the following nested compound statements:

```
BEGIN
    DECLARE a,b INTEGER;
    ...
    BEGIN
        DECLARE c, d INTEGER;
        ...
    END
END
```

Figure 8:
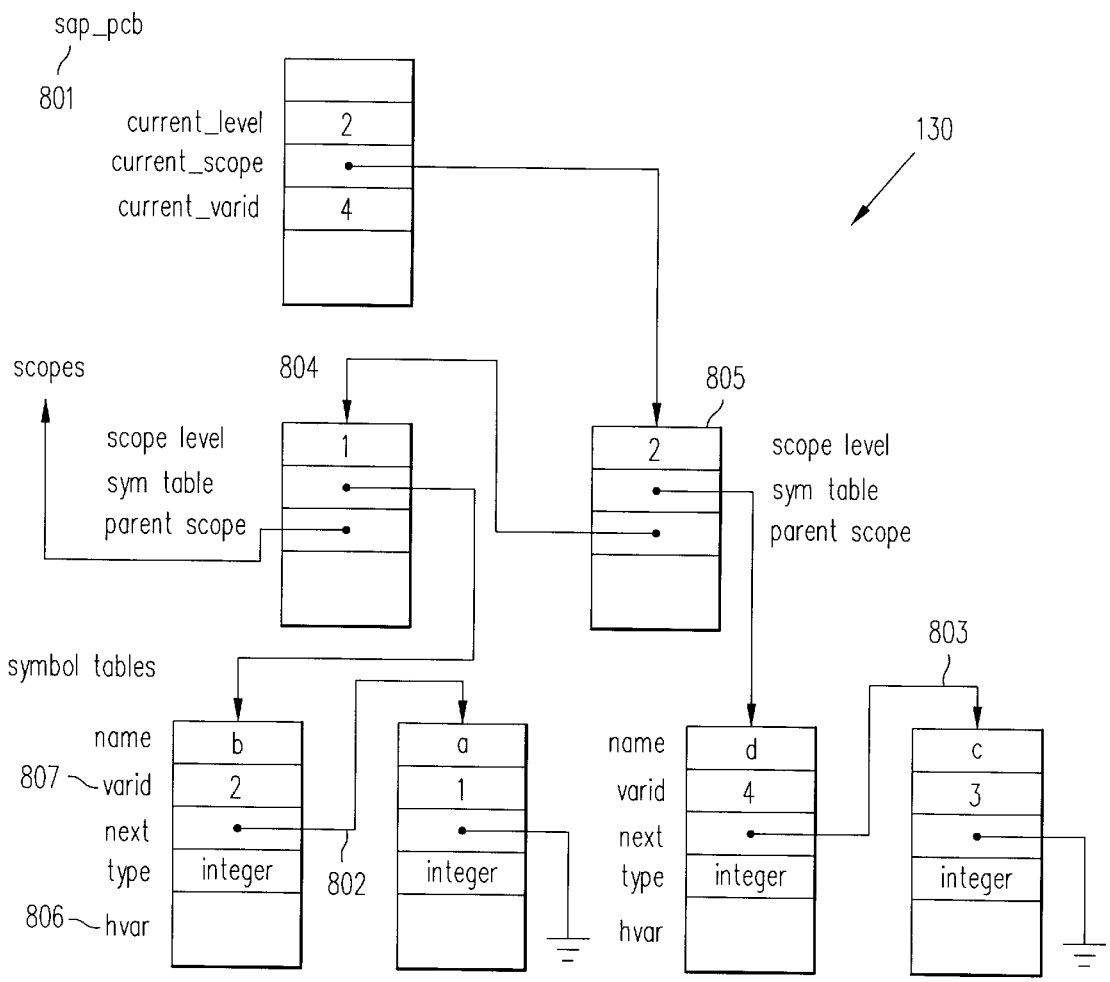
FIG. 8 illustrates a scope and symbol table.

The scopes and symbol tables 130 are shown in FIG. 8. The sap_cbp pointer 801 moves when a scope is created or restored due to compound_statement. A separate symbol table 802, 803 is associated with a scope 804, 805. The variables in the symbol tables will be assigned an entry in the RDS host variable hash table, which is recorded in the hvar field 806. These local variables will be treated just like host variables when they are referenced. How host variables are referenced will be described in more detail below. The varid field 807 of a variable will be unique over all symbol tables.

The syntax tree (AST) is constructed during the semantic checking routines of the parser (like the way QGM is constructed, although no semantic checking is done in this phase). The AST node of a grammar rule basically is built upon the AST nodes that have been generated by the right hand side of the grammar rule. Note that the reorder phase of the parser is not invoked, because SELECT statements have been replaced by SQL_STUBs.

The following describes the AST construction for each statement.

Compound Statement

For <compound_stmt>, the stack contents at the time of reduction are shown at the right hand side
(where XXX denotes don't-care)

```
<compound_stmt> ::=
    <stmt_header>          [0]:SQLNN_SAP_STMT_HEADER_AST *
    <begin_keyword>        [1]:XXX
    <atomic_spec>          [2]:SQLNN_SAP_ATOMIC_SPEC_AST *
    <local_declaration_list> [3]:SQLNN_SAP_AST_LIST_HEAD *
    <SQL_procedure_stmts>  [4]:SQLNN_SAP_AST_LIST_HEAD *
    <end_keyword>          [5]:XXX
    <stmt_trailer>         [6]:SQLNN_SAP_STMT_TRAILER_AST *
``` where each [i] indicates the stack position that an AST node pointer is put in. The AST nodes produced by <compound_stmt_header> and <compound_stmt_trailer> basically record the label, if any. The <begin_keyword> opens a new scope for (sap_cbp→current_scope) (saves the old scope in its parent_scope and increments sap_cbp→current_level). Thus later the local variable declaration will be in this new scope. The <atomic_spec> records whether ATOMIC is specified. The AST of <local_declaration_list> links each local_declaration through the next_ast pointer. The detail of constructing AST for variable declarations within <local_declaration> is described below. The body of the compound statement is a list of AST nodes of <SQL_procedure_stmt>.

Figure 9:
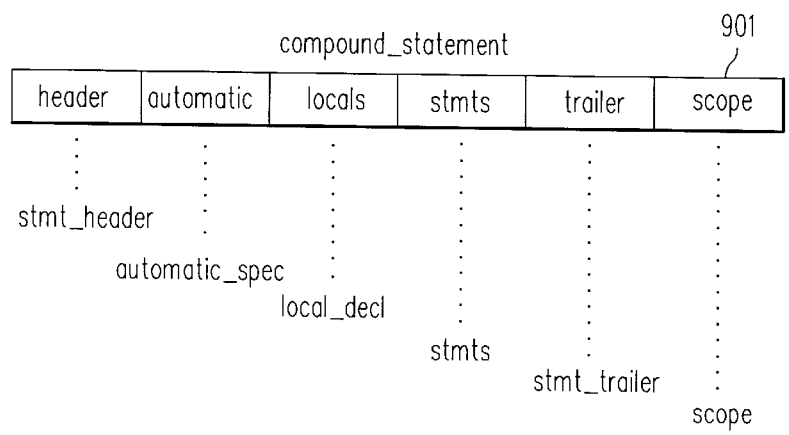
FIG. 9 illustrates a syntax tree node for a compound statement.

The AST node 901 for <compound_stmt> is shown in FIG. 9 (also refer to the data structure). Its child nodes are from the current stack contents, except the scope field. The scope is the one created by <begin_keyword>. After this AST is generated, the current scope is restored to the one prior to this <compound_stmt>. After this rule is processed, the AST node pointer produced is put on top of the stack:

```
[0]:   SQLNN_SAP_CMPD_STMT_AST *
```

Declare Statement

The <local_declaration_list> is a list of local declarations which in turn are SQL variable declarations <SQL_variable_declaration>. The stack contents at the time of reduction are:

```
<SQL_variable_declaration>    ::=
    DECLARE                   [0]:XXX
    <SQL_variable_name_list>  [1]:SQLNN_SAP_AST_LIST_HEAD *
    <constant_or_updatable>   [2]:SQLNN_SAP_CONST_OR_UPDATABLE_AST*
    <data_type>               [3]:class sqlnn_dat_TYPTYPE *
```

The AST node of <constant_or_updatable> describes the storage class of this variable list. <SQL_variable_name_list> is a list of AST nodes of variable names, each of which contains its name, length, and a pointer to its symbol table entry in the current scope.

Figure 10:
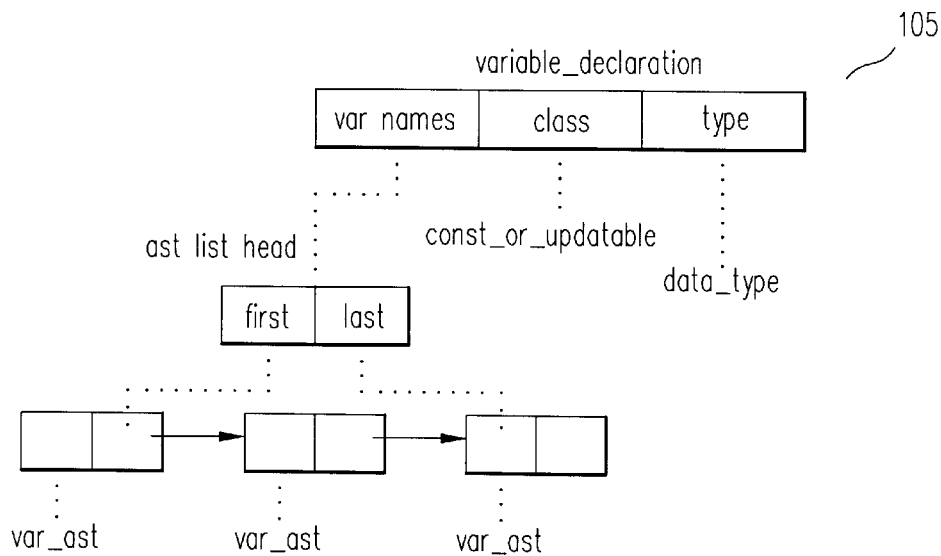
FIG. 10 illustrates a syntax tree node for a variable declaration.

The AST node 105 for this rule is shown in FIG. 10. At the end of this grammar rule, a RDS host variable entry will be allocated (allocate the host variable table if necessary) for each variable in this declare statement, and record it in the hvar field of the symbol table entry. Therefore, when these variables are referenced later, their RDS host variable entries will exist.

After this rule is processed, the AST produced on the stack is:

```
[0]: SQLNN_SAP_VAR_DCL_AST *
``` which has its fields filled from the parse stack contents.
Query Stub Statement

---
For SQL_STUB,
<SQL_procedure_stmt> ::= SQL_STUB

---

The AST node constructed is a simple node without any child. It contains a pointer to its corresponding compilation unit in sap_cbp. The context where this SQL_STUB is in is recorded in the scope field, which is the scope of the current scope sap_cbp→_current_scope at this point in time.
    The result AST pointer is put on the stack:

---
[0]: SQLNN_SAP_SQL_STUB_AST *

---

If Statement
    For the simplified IF statement,

---
```
<if statement> ::=
    IF                       [0]: XXX
    #SAPtmp#                 [1]: int (which compilation unit)
    THEN                     [2]: XXX
    <SQL_procedure_stmts>    [3]: SQLNN_SAP_AST_LIST_HEAD *
    ELSE                     [4]: XXX
    <SQL_procedure_stmts>    [5]: SQLNN_SAP_AST_LIST_HEAD *
    END IF                   [6]: XXX
```
---

Figure 11:
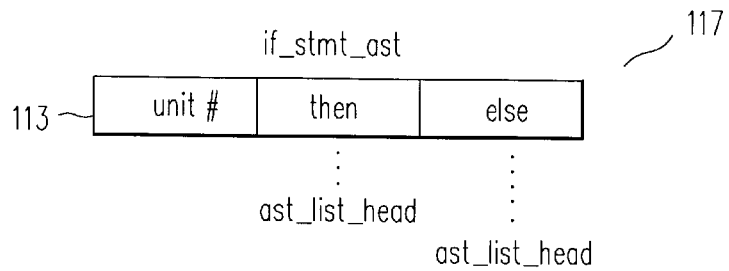
FIG. 11 illustrates a syntax tree node for an IF statement.

Note that the condition has become a #SAPtmp#, and the parser will push its corresponding compilation unit number on the stack. See below for detail on host variable referencing. The AST node 117 created is shown in FIG. 11, where unit#, 113, is the compilation unit that results from the condition. The top of the stack now is an IF AST node:

---
[0]: SQLNN_SAP_IF_STMT_AST *

---

Figure 12:
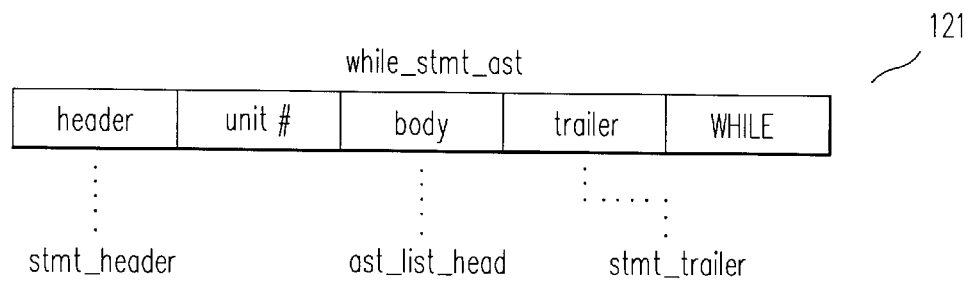
FIG. 12 illustrates a syntax tree node for a WHILE statement.

While Statement
    The WHILE statement, REPEAT statement, and LOOP statement all generate the same kind of AST node, differentiated by the field loop_type. The AST node 121 for WHILE statement is shown in FIG. 12.

---
```
<while statement> ::=
    <stmt_header>            [0]: SQLNN_SAP_STMT_HEADER_AST *
    WHILE                    [1]: XXX
    #SAPtmp#                 [2]: int (which compilation unit)
    DO                       [3]: XXX
    <SQL_procedure_stmts>    [4]: SQLNN_SAP_AST_LIST_HEAD *
    END WHILE                [5,6]: XXX
    <stmt_trailer>           [7]: SQLNN_SAP_STMT_TRAILER_AST *
```
---

Figure 13:
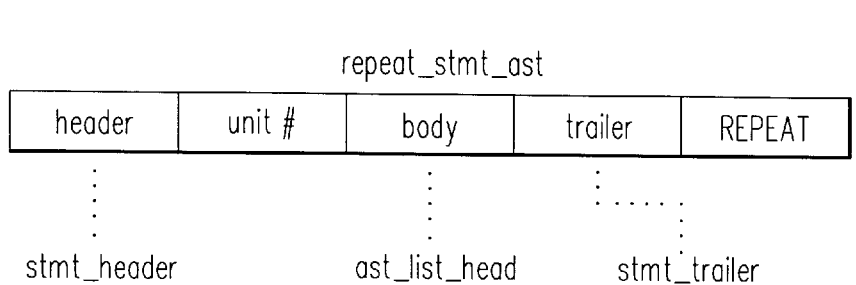
FIG. 13 illustrates a syntax tree node for a REPEAT statement.

Repeat Statement
    The AST node 131 for REPEAT statement is shown in FIG. 13.

```
<repeat statement> ::=
    <stmt_header>              [0]: SQLNN_SAP_STMT_HEADER_AST *
    REPEAT                     [1]: XXX
    <SQL_procedure_stmts>      [2]: SQLNN_SAP_AST_LIST_HEAD *
    UNTIL                      [3]: XXX
    #SAPtmp#                   [4]: int (which compilation unit)
    END REPEAT                 [5,6]: XXX
    <stmt_trailer>             [7]: SQLNN_SAP_STMT_TRAILER_AST *
```

Loop Statement

Figure 14:
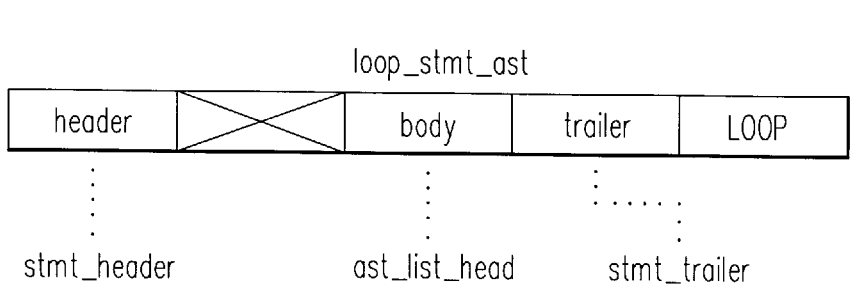
FIG. 14 illustrates a syntax tree node for a LOOP statement.

The AST node 144 for LOOP statement is shown in FIG. 14.

```
<loop statement> ::=
    <stmt_header>              [0]: SQLNN_SAP_STMT_HEADER_AST *
    LOOP                       [1]: XXX
    <SQL_procedure_stmts>      [2]: SQLNN_SAP_AST_LIST_HEAD *
    END LOOP                   [3,4]: XXX
    <stmt_trailer>             [5]: SQLNN_SAP_STMT_TRAILER_AST *
```

Leave Statement

Figure 15:
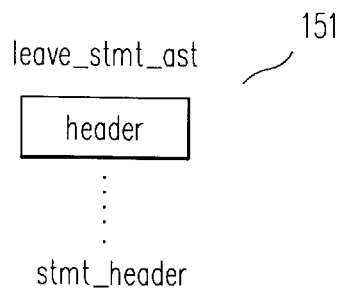
FIG. 15 illustrates a syntax tree node for a LEAVE statement.

The AST node 151 for LEAVE statement is shown in FIG. 15.

```
<leave statement> ::=
    LEAVE
    <stmt_header>  [0]:SQLNN_SAP_STMT_HEADER_AST *
```

Compiling the Declarative Part

The following discusses the Query Compiler path and compiling query statements. The previous section describes how the SAP skeleton (i.e., sap_cmpl_unit[0]) is processed. In this section we describe how the other compilation units sap_cmpl_unit[i], i>0, are processed. Recall that these compilation units are extracted because they can be compiled by the existing query compiler path without any change, almost. Each of these compilation units can be viewed just as an independent input SQL statement to the query compiler to obtain their access plans. It is the responsibility of SAP skeleton code generation to glue these plans together.

Therefore, for each of the compilation units, it will go through the whole normal query compilation path: parser, query global semantics, query rewrite, plan optimization, and threaded code generation. However, there is one difference from the original query compiler. Because local variables can be referenced in a query statement, and this is new to a query compiler, the query compiler will perform a name resolution function to determine what the local variable is. If the name resolution function fails to find a column name, instead of returning an error message, it will invoke the symbol table look-up routine. Instead of returning the local variable, it will return the host variable name to the semantic routine of the query compiler by the mapping of local variables to host variable names. This is how local and host variables are unified. This is a minimal modification to the original query compiler since it already handles host variables. Therefore, the query compiler will set up the scope for local variable look-up and compile each of the extracted statements using the enhanced name resolver for local variable references. So the only thing modified in the original query compiler is the enhancement to the name resolver to look up local variables when if fails to find a column name.

With reference to FIG. 1, query statements 102 produced by the pre-processor are compiled, one by one, into executable plans using the original query compiler 110, 112, 114, 115, 116, 118, 119. Since local variables are treated as host variables, their occurrences in a particular query statement are converted into columns of the corresponding QGM host variable table. The attributes of the local variable are provided by the symbol table service routines introduced in the SAP compiler. At code-generation time, a normal bind-in (bind-out) operator is generated to pass the value of a local variable into (out of) the executable plan of the query statement. The actual SQLDA of the query statement will be initialized, at run time, by some preamble threaded code which is generated at plan-synthesis time. The detail of the mapping is described further below.

Figure 4:
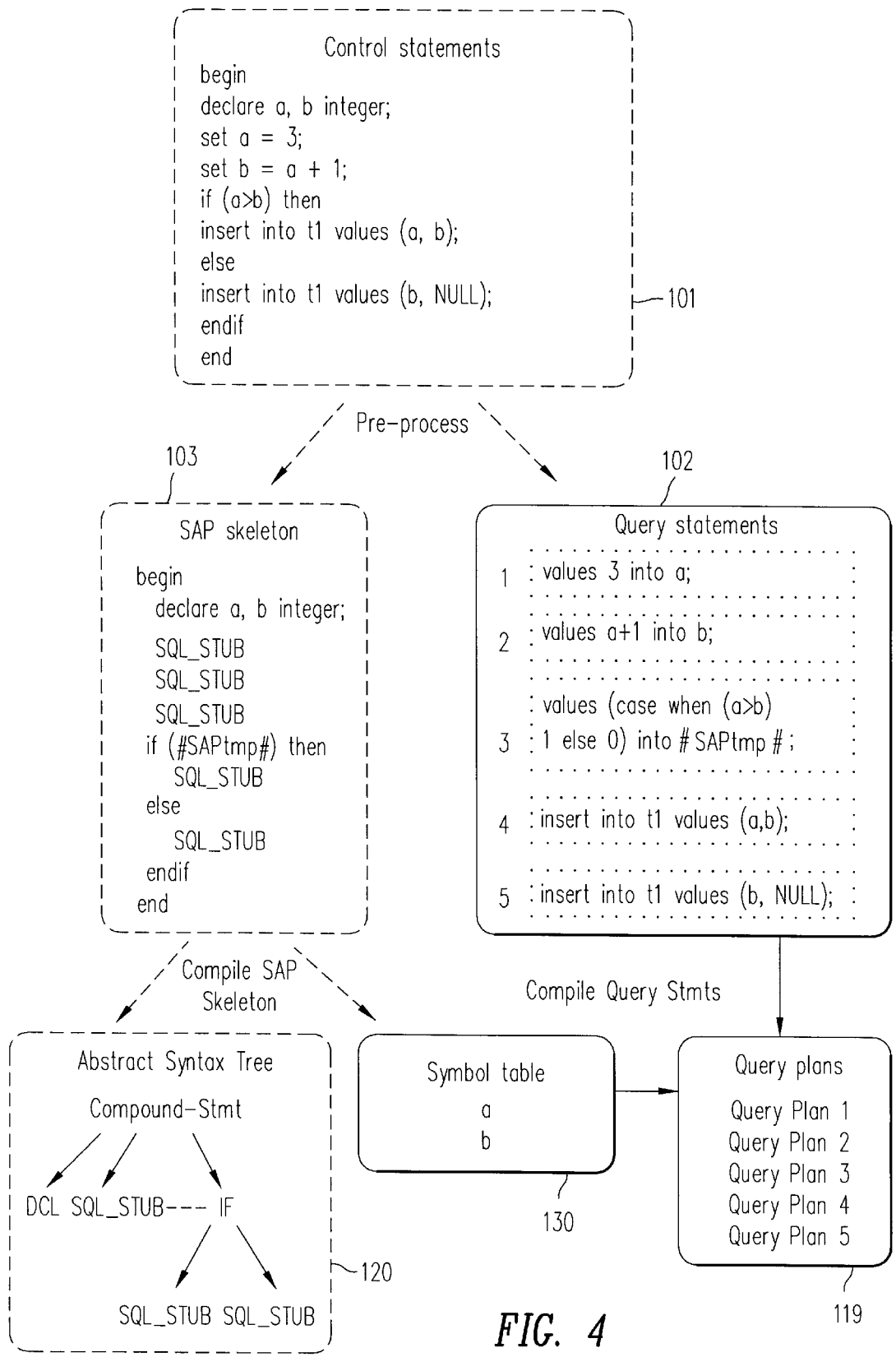
FIG. 4 illustrates compiling query statements into executable plans using the original query compiler and using the symbol table service routines of the SAP compiler to provide the attributes of the local variables in the query plans.

FIG. 4 illustrates this process. Each query statement is compiled into a separate execution plan. The symbol table look-ups are needed to allow referencing local variables before a normal unknown-object-name error message is issued.

The following describes some of the issues in this phase. The term "an input SQL statement" will be used to mean one of these compilation units.

Statement Scope

Recall that each compilation unit has a field scope that records the context where this input SQL statement is in. Each scope 804, 805 defines a symbol table 802, 803 and has a link to its parent scope (as shown in FIG. 8). If the input SQL statement is embedded in a compound statement, then it may reference some of the local variables defined in any of its enclosing compound statements. Thus, a symbol table look-up may go up to the symbol table in the parent scope or further if a variable is not in the current scope.

Mapping Local Variables to Host Variables

As mentioned before, local variables are treated as if they were host variables to minimize the impact to the current compiler. For each occurrence of a host variable in an SQL statement, there is a plan object allocated by the code generator in the access plan, and the bind-in/bind-out process simply maps the n-th plan object to the n-th SQLDA entry. The following describes the work to be done before code generation in order to accomplish this for local variables, so that bind-in/bind-out can be correctly handled.

As in the normal case, each input and output host and local variable is assigned separately with a different number. Each compilation unit has its own numbering of host and local variables referenced (no_of_var_ref) and updated (no_of_var_upd). The number given to a variable will be used as an index to one of the two maps, var_ref_map and var_upd_map, which maps a local variable to its symbol table entry and maps a host variable to an offset in SQLDA supplied by the pre-compiler. For each local variable, a storage of the structure sqlz_value will be created during code generation, and the pointer to that structure will be stored in its symbol table entry.

Figure 7A:
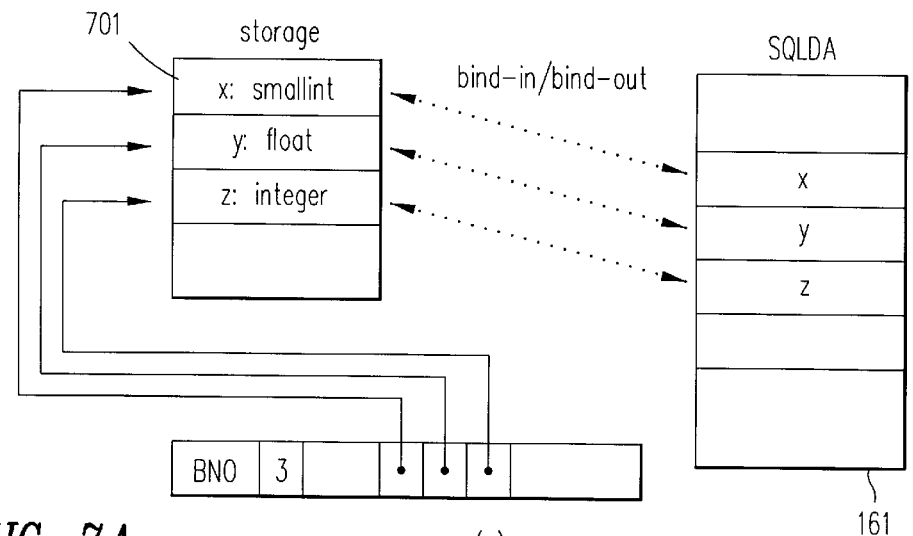
FIG. 7A illustrates the original bind-in/bind-out process.

FIG. 7A depicts the current mapping between section objects 701 and the SQLDA 161 for the following query with host variables x, y and z:

```
SELECT INTO :x, :y, :z FROM t WHERE . . .
```

Now, consider the following compound statement, where x is a host variables, and a, b are local variables:

```
// x is a host variables
BEGIN
    DECLARE a, b INTEGER;
    . . .
    SELECT INTO :x, a, b FROM t WHERE t.c > 0;
    . . .
END
```

Figure 7B:
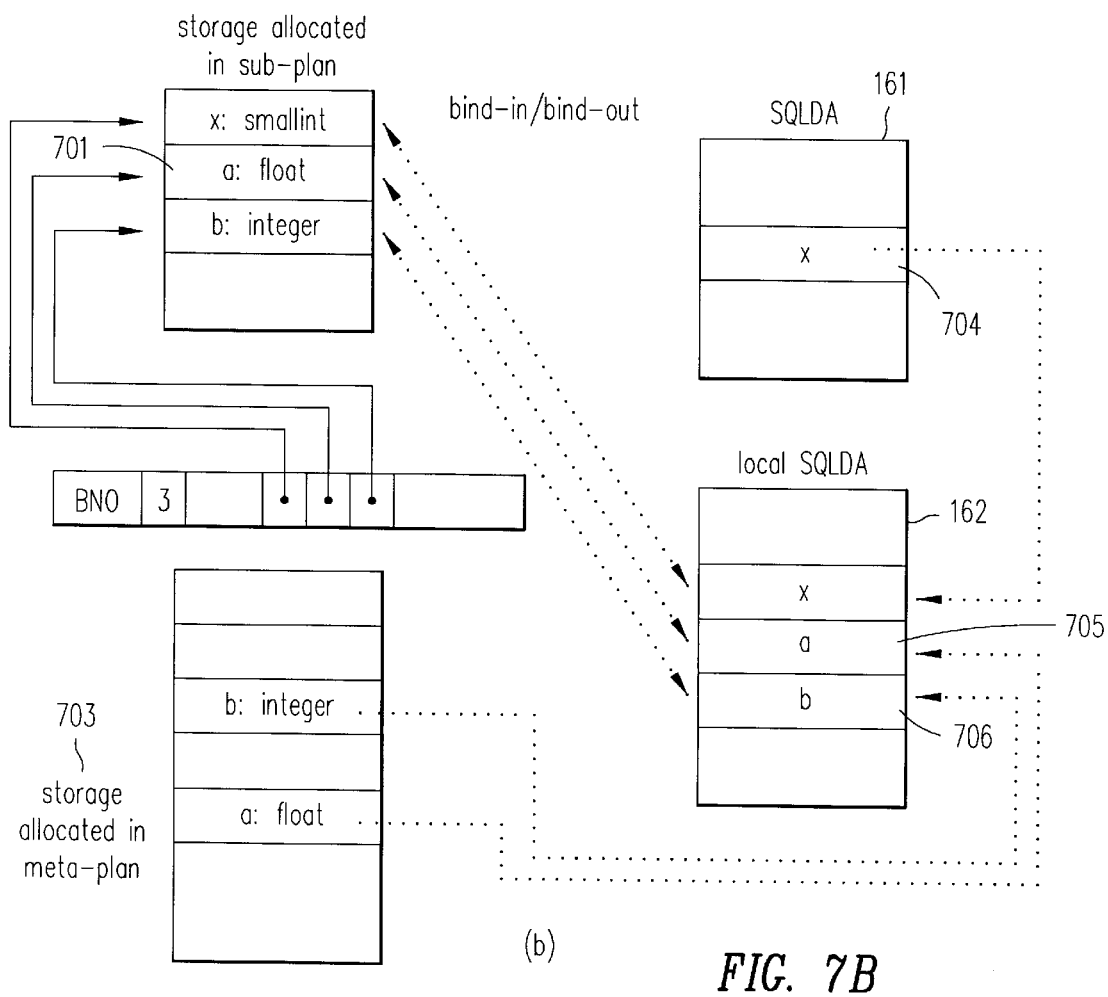
FIG. 7B illustrates the new bind-in/bind-out process when there are local variables a and b.

The SELECT statement will be extracted into a separate compilation unit. Since only x is known by the pre-compiler as a host variable, there is only one SQLDA entry 704 created. A simulated, i.e.,fake, SQLDA 162 is created, where two entries 705, 706 are inserted for local variables a and b. This simulated SQLDA is used for the bind-in/bind-out operation of this extracted compilation unit. The term local SQLDA 162 will be used to refer to this simulated SQLDA because this SQLDA is local to each extracted SQL statement. Since local variables a and b are treated as host variables in QGM (possessing column objects), they, like x, will have plan objects 701 allocated in the plan. See FIG. 7B. Another global storage 703 is allocated in the meta-plan of the SAP skeleton, which acts as a "persistent" store that allows the values of local variables to live across multiple SQL statements.

In constructing the local SQLDA for an extracted SQL statement, like the way host variables are treated currently, each occurrence of host variables, as well as local variables, will be numbered (as before, input and output are numbered separately). For example,

```
SELECT INTO :x^{o1}, :y^{o2}, a^{o3} FROM t WHERE t.c = b^{i2} + :x^{i1};
``` where the superscript ik(ok) denotes input (output) variable number k. In addition, the two maps, var_ref_map and var_upd_map, map a local variable to its symbol table entry and map a real host variable to its corresponding SQLDA entry that is supplied by the pre-compiler. The number given to a variable will be used as an index to one of the two maps. During the meta-plan generation, a plan object will be allocated for each local variable, and the pointer to the object will be stored in the corresponding symbol table entry. Therefore, during the plan generation of this SQL statement, a local SQLDA can be constructed according to the information stored in the two maps; that is, a host variable will have an entry copied from real SQLDA, while a local variable will have an entry copied from the meta-plan plan object, through its symbol table entry.

Figure 16:
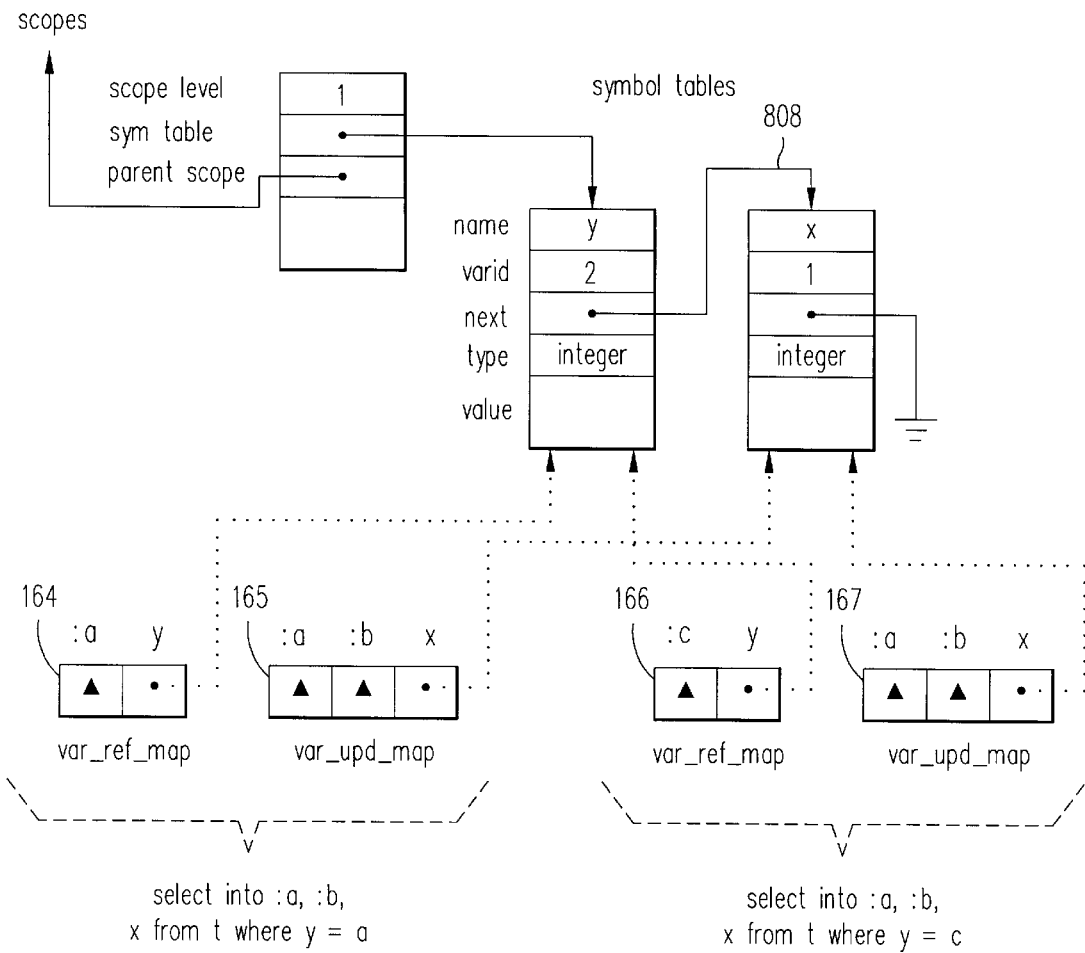
FIG. 16 illustrates two maps which map a host variable (denoted by a triangle marker) to a runtime storage position and which map a local variable (denoted by a circle marker) to its symbol table entry.

Consider, also, the following example. FIG. 16 shows the symbol table 808 and the contents of the two maps 164, 165 and 166, 167 for each of the query statements.

```
// x, y, z are host variables
BEGIN
    DECLARE a, b INTEGER;
    . . .
    SELECT INTO :x, :y, a FROM t WHERE t.c = b + :x;
    . . .
    SELECT INTO :x, :y, a FROM t WHERE t.c = b + :z;
    . . .
END
```

After the Query Extractor, the SELECT statements will be replaced by SQL_STUBs. During the SAP compilation path described in the previous section, when the DECLARE statement is processed, the symbol table entries (in the new scope) are generated for a and b, and also RDS host variable entries recorded in the hvar field are generated. Note that the real host variables, x, y, and z also have already had their RDS host variable entries created by the pre-compiler.

Now consider the query compilation path when the first SELECT statement is compiled. In the reorder phase of the parser, real host variables :x and :y of the INTO clause are assigned with output host variable number, say 1 and 2 respectively, and :x of the WHERE clause is assigned with input host variable number, say 1. However, in the reorder phase, nothing special about a and b are done yet. Then in the second parsing phase, when a and b are parsed as <name> for column names, before the semantic action issues error messages, they are intercepted and it is determined if they are defined in the symbol tables. If they are, then they are the local variables; so they are given a number as well and treated like those real input/output host variables (e.g., create QGM columns in the host variable table). In this case, "a" has the output host number 3, and "b" has the input host number 2 (the superscript i1 (o1) denotes input (output) variable number 1):

```
SELECT INTO :x^{o1}, :y^{o2}, a^{o3} FROM t WHERE t.c = b^{i2} + :x^{i1};
```

As shown in FIG. 16, the two maps var_ref_map 164, 166 and var_upd_map 165, 167 map a real host variable to an offset in SQLDA created by the pre-compiler and map a local variable to its symbol table entry. A special marker, such as a negative value, can be used to distinguish these two types (shown as circle and triangle markers in FIG. 11). The value of no_of_var_ref and no_of_var_upd will become an operand in the BNI (bind-in) and BNO (bind-out) run-time operator for this compilation unit.

Similarly for the second SELECT statement, the following numbering is created:

```
SELECT INTO :x^{o1}, :y^{o2}, a^{o3} FROM t WHERE t.c = b^{i2} + :z^{i1};
```

Code generation and runtime implementation to deal with local variables will be described further below.

Recording Access Plan

The pointer to the generated access plan is stored in the section_ptr field of the compilation unit, along with its length section_len.

The Plan Synthesizer

Figure 5:
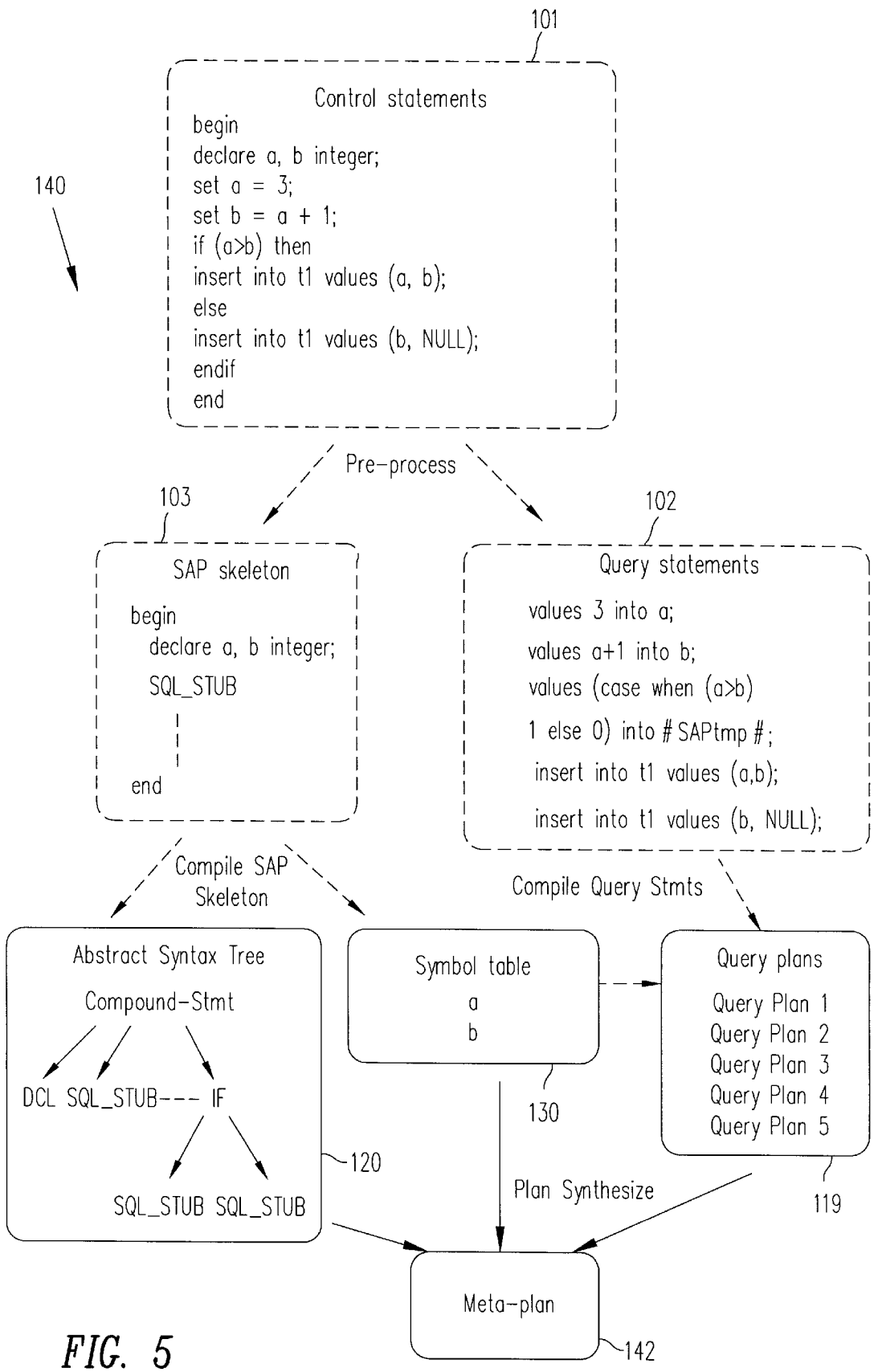
FIG. 5 illustrates generating a meta-plan using the symbol tables, flow control information, and the executable plans.

The plan-synthesizer 140 (FIG. 1) takes the symbol tables 130, the flow control information (PGM) 120, and the individual executable plans (i.e., access section) for the query statement 119 as inputs. Driven by the control skeleton, the plan synthesizer, from the scopes and symbol table, will allocate storage for the local and host variables. The plan synthesizer will then generate a top-level thread for the control skeleton, and generates top-level bind-in/bind-out instructions. It generates a bind-in statement, if necessary, which will bind-in all of the host variables from the application and do a one-time bind-out to get the value back to the application program. The plan synthesizer then embeds the individual query plans into the top-level thread as a sub-thread to generate, as output from the plan synthesizer, a meta-plan 142 (FIG. 5) for the top-level control statement 101. Symbol tables are used to generate threaded-code objects for local variables. Flow control information is used to generate threaded-code which glues together each of the executable plans. This way, at the top-level, an executable plan is created for the procedural part of the control statement. Executable plans corresponding to the declarative part of the control statement are embedded in the top-level plan as sub-plans. When a sub-plan is encountered at run time, the RDS interpreter is recursively invoked for the execution of the sub- plan.

Figure 6:
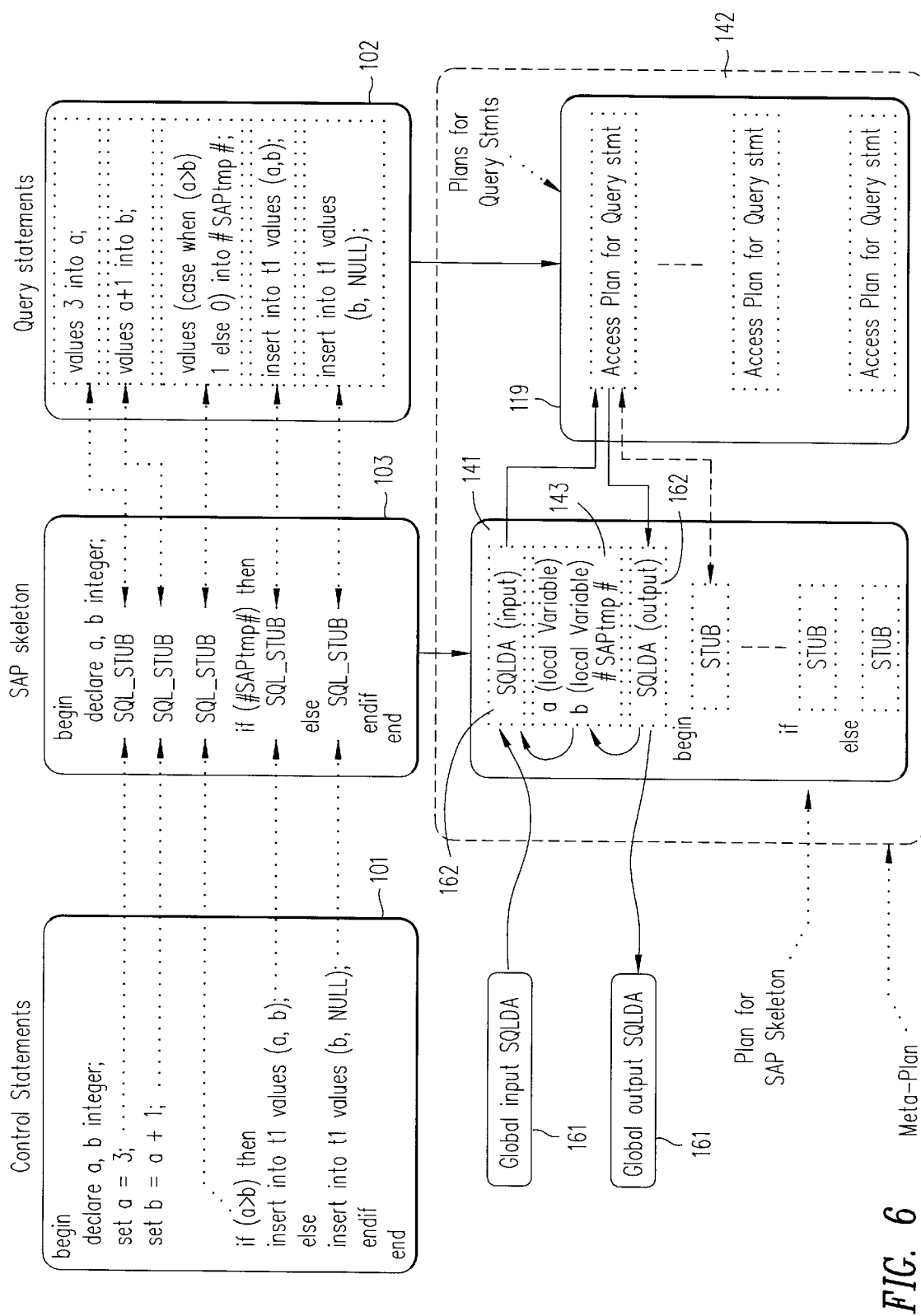
FIG. 6 illustrates the merging of the top-level plan for the SAP skeleton and the individual query plans for the query statements into a meta-plan.

As shown in FIG. 6, the control statement 101 is separated into a procedural 103 and non-procedural part 102 by the query extractor. The procedural part 103 is analyzed by a control analyzer to generate a representation and the non-procedural part 102 is processed through a query compiler to generate executable plans 119 for each query statement. The plan synthesizer synthesizes the top-level thread 141 corresponding to the control statement and the executable plans for the query statement into a meta-plan 142. Because all of the local variables are mapped to host variables, the query compiler will generate a plan which will expect a host variable coming from the application which is sent out through a SQLDA structure. (An SQLDA structure is a structure that is used to communicate between the application and the server.) Because of this, before accessing each of the sub-plans, there is a mapping function for the top-level thread for generating local SQLDAs (one input and one output) 161 and 162 for the entire meta-plan. Because there is a top-level bind-in instruction generated for binding in all of the host variables from the application into storage for the executable code at run-time, for each of the individual query statements the SQLDA structure will be populated to point to the right location in the binding-in of the variables 143. This solves the bind-in/bind-out problem with multiple ordered variables and variable sharing. No data movement is involved. Instead, in-between the one time bind-in and bind-out process, there is created a local SQLDA structure with a pointer set up to the right variable for that query statement.

Synthesizing the Meta-Plan

As indicated in FIG. 1, the plan-synthesizer takes as input the syntax tree (AST) for the SAP skeleton, the symbol table, and the plans for the extracted query statements and generates as output a meta-plan for the target control statement. A meta-plan is an access plan with other plans embedded in it as sub-plans. At runtime, these sub-plans will be executed by recursively invoking the RDS (Relational Data Services) interpreter.

The synthesis of a meta-plan takes place in three steps. At its early stage, the synthesizer performs the initialization of data structures which will be accessed during the plan-synthesis phase. The plan object for #SAPtmp# is also allocated here. Following this step, the synthesizer is driven by the AST of the SAP skeleton to generate threaded code for the procedural part of the target control statement. For example, when a DECLARE statement is encountered, a plan object is allocated in the meta-plan for each local variable, as described above. For IF, WHILE and other loop constructs, the code generation is straightforward. When an SQL_STUB AST node is encountered, the STUB operator is inserted and the access plan of the corresponding query statement is appended, i.e., merged into, the meta-plan. At the end of the AST-traversal, all the sub-plans are chained together, and the resulting meta-plan is completely synthesized and is ready for execution. At runtime, when the meta-plan is loaded, the pointer in each sub-plan will be relocated.

Five operators are added to the current instruction suite to accomplish the code-generation of the SAP skeleton and the synthesis of the meta-plan.

SQLRI_BEG: the beginning of a compound statement.
SQLRI_END: the end of a compound statement.
SQLRI_IF: conditional branch operator.
SQLRI_JMP: unconditional jump operator.
SQLRI_STUB: the sub-plan glue operator.

As indicated above, the IF operator handles conditional branches, a BEG operator and an END operator delimits a compound statement with an optional atomic flag, and a STUB operator glues sub-plans and their input and output, host and local, variables.

The details of the plan-synthesis process is described below.

Global Initialization

In an SQL3 control statement, a host variable may or may not appear in a query statement. Besides, the ordinal number of a host variable varies from one query statement to another. Therefore, a "local" input SQLDA and a "local" output SQLDA are needed in order to compose the appropriate host variable array for each individual query statement (sub-plan). The storage of the input SQLDA and output SQLDA are allocated and the offsets are saved in the sqldai_Xx and sqldao_Xx fields of the SAP control block sap_cb.

Storage allocation for the compiler-generated variable, #SAPtmp#, also takes place at this stage. The offset of the storage is saved in the #SAPtmp#.value field of sap_cb control block. This variable is used to store the result of an SQL search condition which is extracted from an IF statement, a WHILE statement, or a REPEAT statement.

Because the "jump forward pointer" of a LEAVE statement is unknown at the time when the LEAVE statement is being processed, two lists are introduced to patch such a pointer when the address becomes available. The leave_stmt field of the sap_cb control block maintains the list of un-resolved LEAVE statements. When a LEAVE statement is encountered, it is added to this list. Then at the end of the code-generation process for a statement s, where s is a compound statement, LOOP statement, WHILE statement, or REPEAT statement, the entries in the leave_stmt list that specify s as its target are moved to the JmpFwd_list list. Finally, at the time before code for the following statement is generated, this JmpFwd_list list will be traversed to patch the jump forward pointers. At the global initialization time, both lists are set to a null list.

Code Generation for SAP Skeleton

Compound Statement

For a compound statement, the plan synthesizer will first generate an SQLRI_BEG instruction which marks the beginning of a new scope. It then recursively invokes the synthesizer to generate code for the pertaining declaration statements and executable statements. At the completion of the recursive invocation, an SQLRI_END instruction is generated to mark the end of the current scope.

Figure 17:
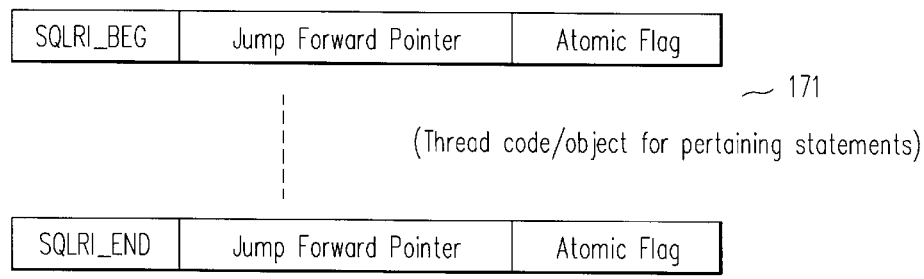
FIG. 17 illustrates the code generation sequence for a compound statement.

The code generation 171 for a compound statement has the sequence shown in FIG. 17. The operand Atomic Flag indicates whether this compound statement has to be executed atomically.

As the last step, the synthesizer goes through the leave_stmt list anchored from the sap_cb control block and moves those entries whose label is the same as that of the compound statement to the JmpFwd_list list. The JmpFwd_list list will be used and emptied at the code-generation time of the very next statement to patch the jump forward pointers left over by LEAVE statements.

Declare Statement

There is no threaded code generated for a DECLARE statement. Instead, an sqlz_value storage structure is allocated for each variable appearing in the statement. The type and length information is also populated into the structure. Finally, the offset of the storage structure is saved in the value field of the corresponding symbol table entry.

If Statement

Figure 18:
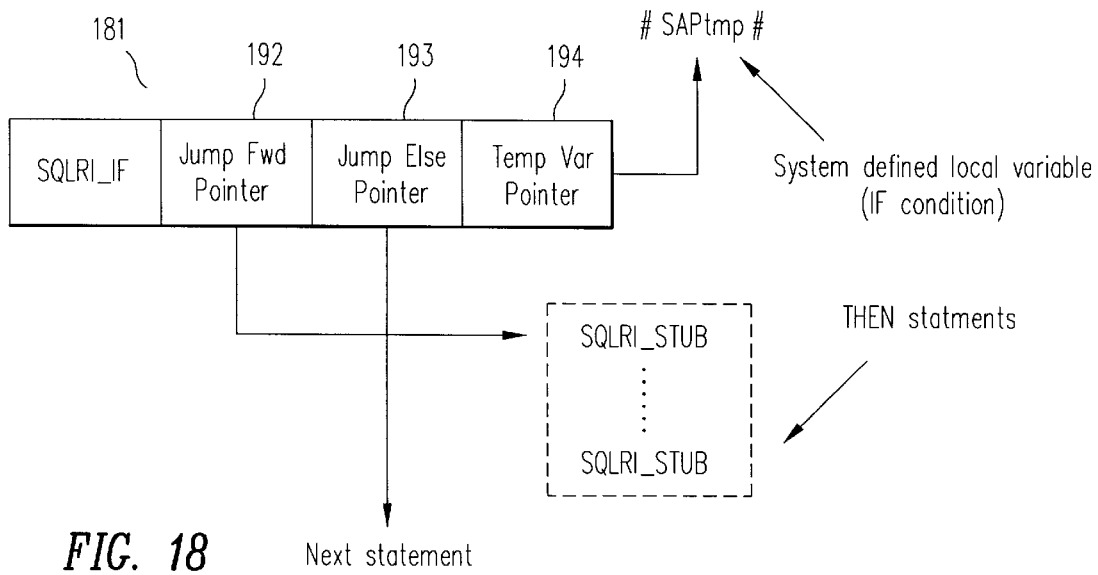
FIG. 18 illustrates the threaded code for an IF statement without the ELSE branch.

FIG. 18 shows the threaded code 181 for a IF statement without the ELSE branch. The second field 192 points to the first statement of the THEN branch. The third field 193 points to the statement immediately following current statement. The last field 194 identifies the #SAPtmp# variable which holds the truth value of the IF condition.

Figure 19:
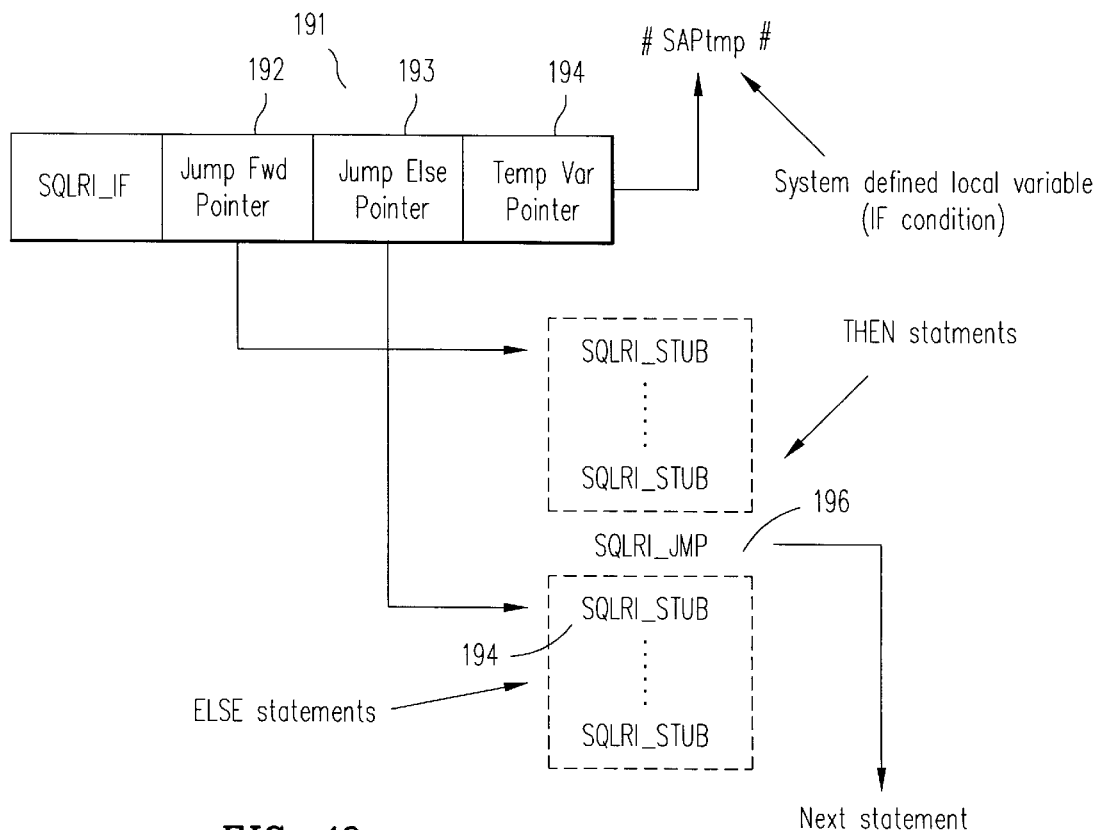
FIG. 19 illustrates the threaded code sequence for an IF statement with the ELSE branch.

FIG. 19 shows the threaded code 191 which corresponds to the case where ELSE branch exists. As shown by the diagram, it is similar to the previous case except that the third field 193 now points to the first statement of the ELSE branch and a unconditional jump statement 196 is inserted between the THEN branch and the ELSE branch.

While Statement

Figure 20:
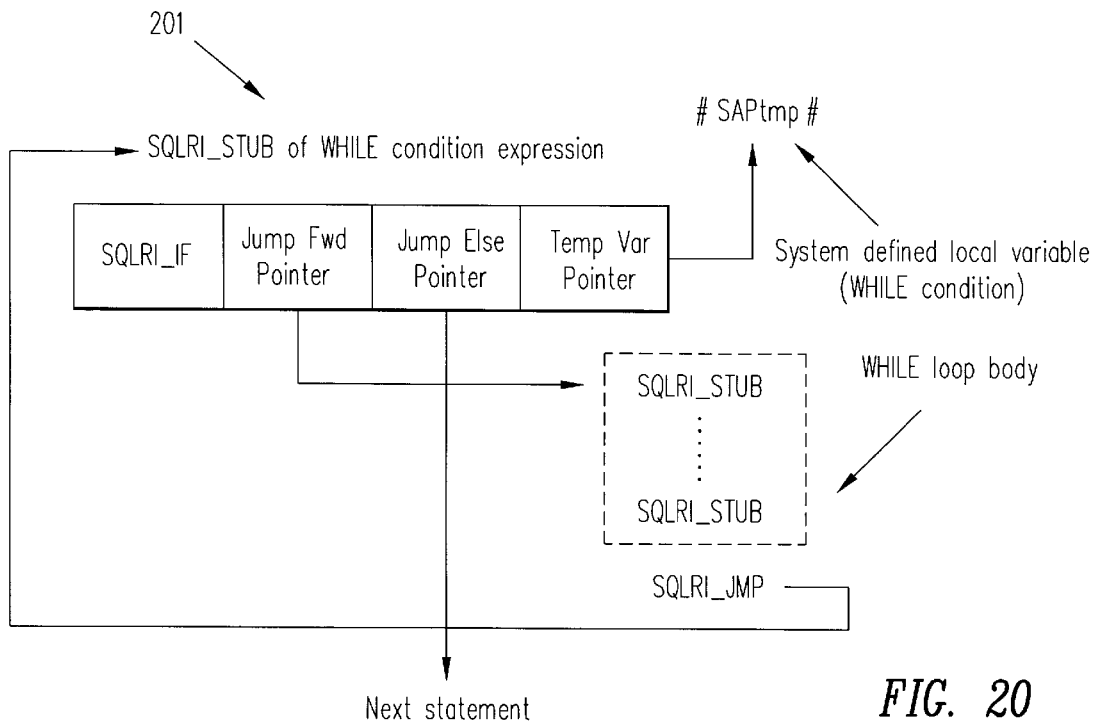
FIG. 20 illustrates the threaded code sequence for a WHILE statement.

A WHILE statement is code-generated as if it were a IF statement without the ELSE branch. The loop body is treated as the THEN branch of the imitated IF statement. Finally, an unconditional jump statement is placed at the end of the loop body to jump back to the previous statement where the WHILE condition is evaluated. FIG. 20 shows the layout of the threaded code 201 corresponding to a WHILE statement.

In order to generate the tailing jump instruction, the offset of the statement where the condition is evaluated is saved in the jmp_then_Xx field of the sap_cb control block.

The Jump else pointer of the IF instruction is patched in the same way as the LEAVE statement; an entry is inserted into JmpFwd_list so that the forward address will be fixed up later.

Repeat Statement

Figure 21:
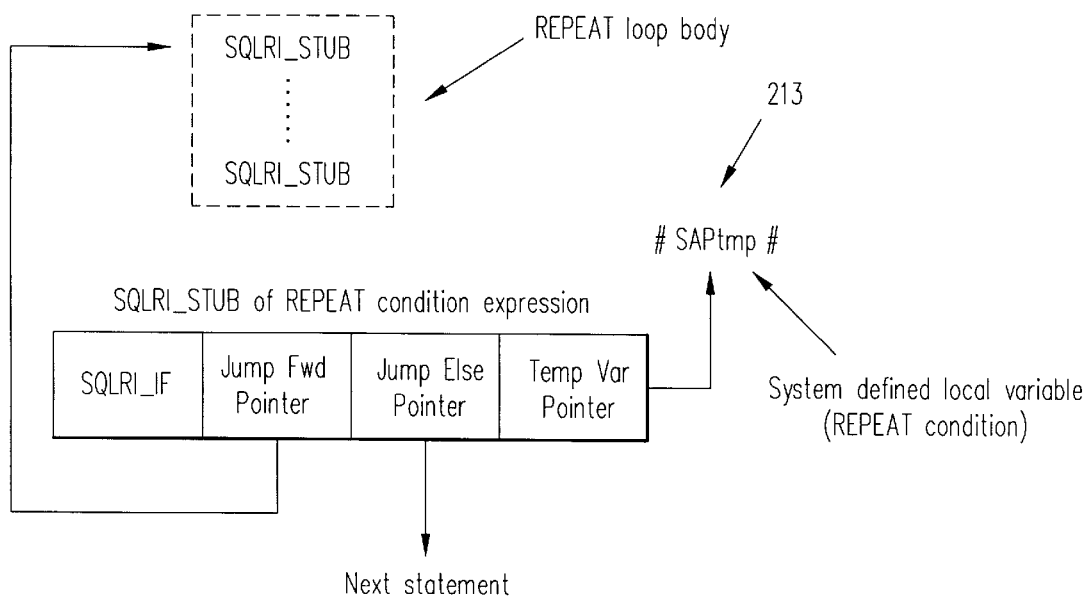
FIG. 21 illustrates the threaded code sequence for a REPEAT statement.

The REPEAT statement is treated in a way similar to that of the WHILE statement. However, the IF instruction is placed after the loop body. The second field of the IF instruction now points back to the beginning of the loop body. This is achieved by saving the offset of the loop body head in a local variable. The layout of the threaded code 213 is shown in FIG. 21.

Loop Statement

Figures 22, 23:
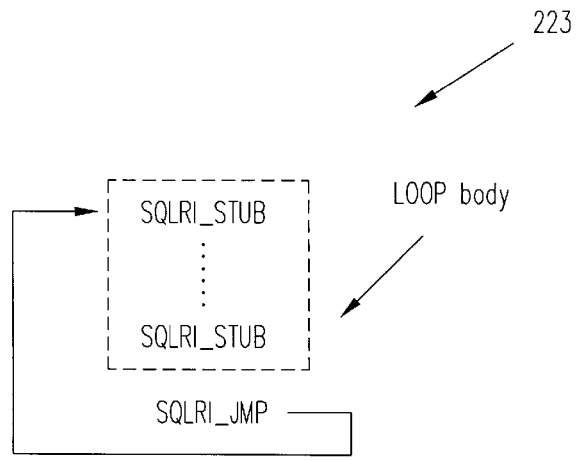
FIG. 22 illustrates the threaded code sequence for a LOOP statement.
FIG. 23 illustrates the format of the SQLRI_STUB operator.

Execution of a LOOP statement terminates when a LEAVE statement is encountered in the loop body. Therefore, the code generation 223 of a LOOP statement is straightforward and is shown in FIG. 22. An unconditional jump instruction is inserted at the end of the loop body to jump back to the head of the loop.

Leave Statement

An unconditional jump instruction is generated for a LEAVE statement. The mechanism for patching the jump forward pointer is as described above.

Merging Sub-plans

The main function of the plan-synthesizer is to generate code which provides information necessary for runtime to build SQLDAs and execute SQL_STUB sub-plans. The format of the SQLRI_STUB operator 233 is shown in FIG. 23. The field, plan pointer 234 and plan length 235, points to the access plan and its code length of this query statement. The next two fields 236, 237 indicate the number of input and output host variables (obtained from no_of_var_ref and no_of_var_upd). The following two fields 238, 239 are the base to the "local" SQLDAs created in the global initialization described earlier (sqldai_Xx and sqldao_Xx), and finally are the two lists 243, 253 of offsets for the input and output variables (both real host variables and local variables). For host variables and local variables, the values are obtained from the value field of their symbol table entries.

Figure 24:
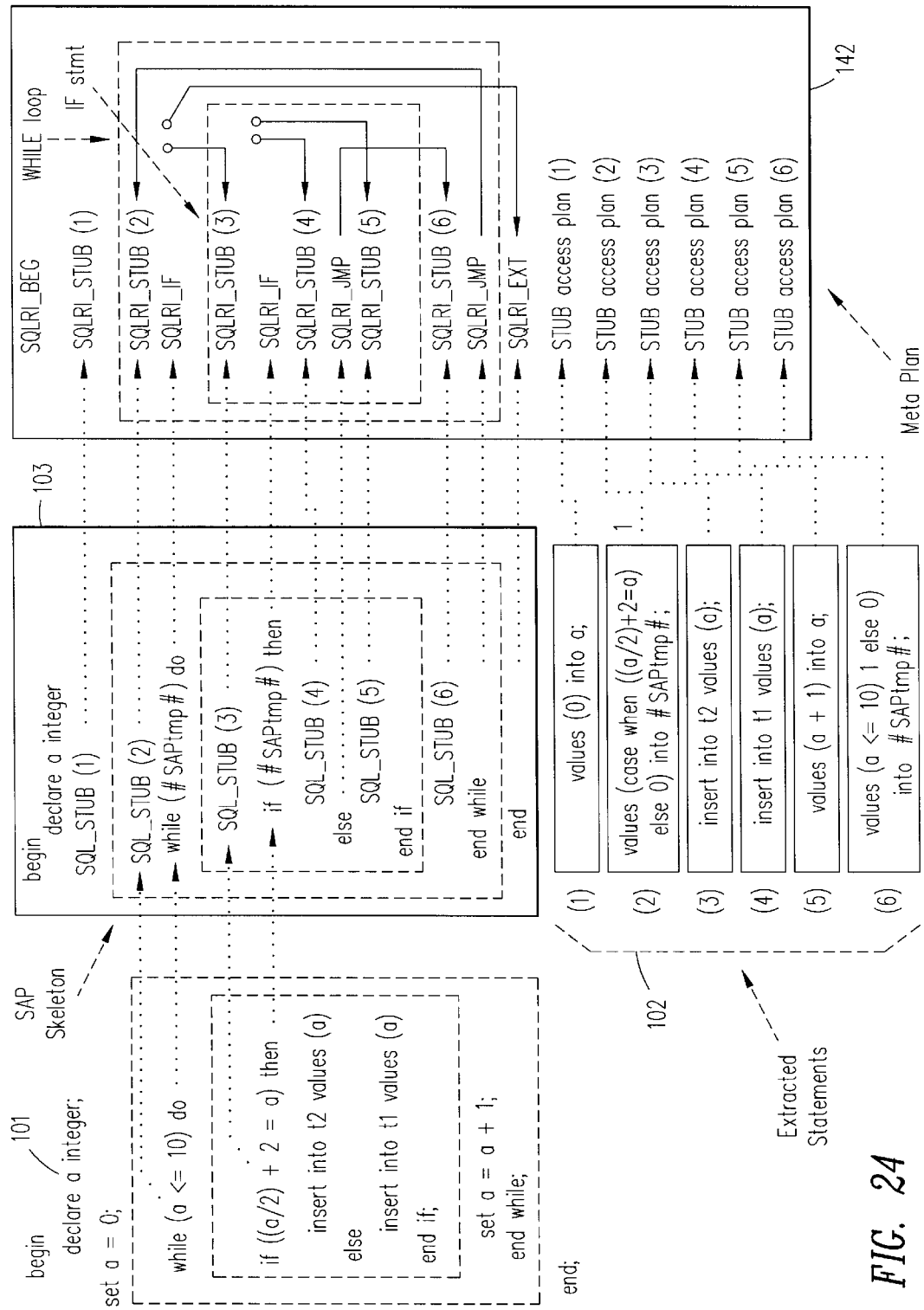
FIG. 24 illustrates an example of a compound statement and the meta-plan generated by the plan synthesizer.

FIG. 24 shows an example of a compound statement and the meta-plan generated by the plan synthesizer.

The Run-time Component

Relocation of Meta-plan

A meta-plan may contain many sub-plans. Each sub-plan corresponds to an SQL statement in the control statement program. All the sub-plans are chained together in a form of a link-list. After the meta-plan is loaded, the pointer in each sub-plan needs to be relocated.

Bind-In and Bind-Out

FIG. 7A shows the original bind-in/bind-out process for host variables. Actual storage area for the host variables is allocated in the access plan by the code generator. The execution of the BNI operator of this plan copies (and does type conversion if necessary) the values in the application SQLDA to this storage area, and the execution of the BNO operator copies the values back to the application SQLDA when the query is finished.

As explained further above, to compose the needed SQLDA for host variables and local variables as well during the bind-in/bind-out process of a sub-plan, a "local" SQLDA will be created when the SAP meta-plan executes the SQLRI_STUB operator that calls the current sub-plan. The local SQLDA has an entry for every host variable and local variable for the query. See FIG. 7B. In this local SQLDA, a host variable has an entry that basically copies the one from the existing SQLDA, and a local variable has an entry that copies the contents from its corresponding entry in the storage created by the code generation of DECLARE statement in the meta-plan. Now, the bind-in process of the current sub-plan copies the values from this local SQLDA to its own storage. And finally the bind-out process will copy the values from its storage to the application SQLDA for host variables and to the meta-plan storage area for local variables.

Control statement Runtime Routines

SQLRI_BEG (Begin Compound Statement operator)

This operator is a no-op at this time. Implementing atomicity in the runtime has not been resolved to date. This operator is needed in the future when recursive control statement is supported. This operator and the SQLRI_END operator described below are used to maintain a runtime stack to assure accessing to the correct variables.

SQLRI_END (End Compound Statement operator)

This operator is a no-op at this time. In the future, this operator is used to restore the run-time environment which is changed by the SQLRI_BEG operator.

SQLRI_STUB (Query Stub operator)

This operator is used to prepare and call the interpreter recursively to interpret the STUB sub-plan. It will first construct the input and/or output SQLDAs, if there is any input or output variables, and save the original SQLDAs and provide the new input/output SQLDAs in the l_sqlr_rcb. Then it calls the interpreter recursively to interpret the STUB sub-plan. And finally, the execution of this operator will restore the original SQLDAs back in l_sqlr_rcb.

SQLRI_IF (If Operator)

This operator is used to check the boolean value pointed by the last operand, and decide which operator is going to interpret next. If the boolean value is TRUE, set the next instruction pointer equal to the Jump forward pointer. Otherwise, set the next instruction pointer equal to the Jump else pointer.

SQLRI_JMP (Unconditional Jump Operator)

At runtime, the next instruction pointer is set equal to the Jump forward pointer when this operator is interpreter.

Data Structures

There are four kinds of data structure used in the SAP compiler. At the top-level is a SAP control block, sap_cb, which organizes all the data structures used in the SAP compiler. The sap_cb control block is anchored from the RDS control block. Therefore, it can be accessed by every component of the database engine.

For the SAP skeleton and each of the preprocessor-generated query statements, there is also a control block, sap_cmpl_unit, associated with it. Typical information contained in this data structure includes: the statement text, the PGM pointer (SAP skeleton only), the containing scope, the pointer to the executable plan (query statement only), etc. These control blocks are ordered as an array and stored in the sap_cb control block.

In its current format, PGM is a set of data structures describing the syntax tree of the control statement. Besides the syntactic information, it could contain semantic information generated at various stages of the SAP compiler as well. One such example is the pointer to the scope in which a symbol is declared. Since PGM is only used for representing the "procedural part" of a control statement, there is only one PGM unit created during the compilation of the control statement. The root of the PGM unit is stored in the top-level control block, sap_cb.

Each compound statement defines a new scope which contains scoping information such as the level of the scope, the pointer to the parent scope, and the pointer to the corresponding symbol table. Scopes are organized as a tree which is "isomorphic" to the containment structure of the compound statements. At anytime of the compilation, the "current" scope is pointed to from the sap_cb control block. The current scope pointer is stored in the PGM structure of the corresponding compound statement as well as the sap_cmpl_unit control block of an embedded query statement.

The C definition for these data structures are given below. Although these data structures are not finalized at this point in time, these data structures still demonstrate the fundamentals of the design of the SAP compiler.

SAP Control Block

The C definition of the sap_cb control block and a brief description of the individual fields are given as follows:

```
typedef struct sqlnn_sap_cb -
    char    eye{8};                      /* Eye catcher: "SAP_CB " */
    int     sap_phase                    /* 0: not a SAP stmt. */
                                         /* 1: source transformation. */
                                         /* 2: compiling SAP skeleton. */
                                         /* 3: compiling query statements.*/
                                         /* 4: synthesizing plan. */
    int no_of_cmpl_unit;                 /* Number of query statements. */
    SQLNN_SAP_CMPL_UNIT  sap_cmpl_unit{MAX_SAP_CMPL_UNIT};
                                         /* Control block for SAP skeleton */
                                         /* and query statements. */
    short current_level;/* Current scope level. */
    SQLNN_SAP_SCOPE
        *current_scope; /* Pointer to current scope. */
    long current_var_id; /* Current variable id. */
    SQLNN_SAP_AST_HEADER
        *ast_head; /* Pointer to the PGM. */
    int next_sql_stub;                   /* Index of the "sap_cmpl_unit" */
                                         /* array; used to associate PGM */
                                         /* node with the coresponding CB.*/
    FILE *dump_file;                     /* File pointer for PGM dump. */
    short hvt_allocated;                 /* Host variable table allocation */
                                         /* indicator. */
    SQLNN_SAP_SYM_ENTRY
        SAPtmp;                          /* temporary local variable */
    ULINT sqldai_Xx;                     /* Offset to input sqlda (tcg) */
    ULINT sqldao_Xx;                     /* Offset to output sqlda (tcg)*/
    SQLNN_SAP_LEAVE_STMT_AST
        *leave_stmt;                     /* List of leave operators (tcg) */
    SQLNN_SAP_LEAVE_STMT_AST
        *JmpFwd_list;                    /* List of ptr to be back patched(tcg)*/
"    SQLNN_SAP_CB, *SQLNN_SAP_CBP;
``` sap_phase

This field indicates current phase of the SAP compiler. Values 0, 1, 2, 3, and 4 correspond to the normal compilation phase, the pre-processing phase, the procedural compilation phase, the query compilation phase, and the plan synthesis phase respectively.

no_of_cmpl_unit

Number of query statements produced by the pre-processor.

sap_cmpl_unit

Array of control blocks for the compilation units produced by the pre-processor.

current_level

The level of the current scope. The scope level of the outermost scope is 1 and is incremented by one when a compound statement is encountered.

current_scope

Pointer to the current scope structure.

current_var_id

Starting with value 1, this variable is incremented by one each time a new local variable declaration is encountered.

ast_head

Pointer to the root of the PGM structures of the SAP skeleton.

next_sql_stub

Index to the sap_cmpl_unit array. This field starts with value 1 and is incremented by one each time an embedded query statement is encountered.

dump_file

File pointer of the file for dumping the formatted PGM and the symbol table.

hvt_allocated

This field indicates whether the host variable table is allocated by the SAP compiler or not.

SAPtmp

This field contains the variable entry for temporary local variable used to save the result of the search condition expression.

sqldai_Xx

This field contains the offset to the input SQLDA allocated by the plan-synthesizer initialization.

sqldao_Xx

This field contains the offset to the out SQLDA allocated by the plan-synthesizer initialization.

leave_stmt

Pointer to the list of leave statements needed to be resolved by the code-generation later.

JmpFwd_list

Pointer to the list of jump forward pointers (offset) needed to be resolved during code generation of the next statement.

Compilation Units

There is one such structure for each compilation unit. A compilation unit is either a SAP skeleton or a query statement produced by the pre-processor. The first two fields of this control block are common to both kinds of compilation unit. However, the rest of the control block is used only for the query statements produced by the pre-processor.

stmt

Text of this statement.

scope

Pointer to the containing scope.

no_of_var_ref

Number of occurrences of local variable which appears in the "read-only" context of a statement.

var_ref_map

Array of local variable ID's which is referenced in the statement.

no_of_var_upd

Number of occurrences of local variable which appears in the "write-only" context of a statement.

var_ref_upd:

Array of local variable ID's which is updated in the statement.

section_ptr

Pointer to the executable plan.

section_len

Length of the executable plan.

The PGM Header Structure

PGM consists of a collection of syntactic structures, each corresponds to a syntactic element of a control statement. All the syntactic structures contain a header structure as a sub-structure. The header structure is intended to contain information which is common to all of the syntactic element. At this point, it contains only the syntactic "type" of the containing PGM structure. It could also contain other information such as the location (file, line, column) of the syntactic element. The C definition of the syntactic types and the header structure are given as follows:

```
typedef struct sqlnn_sap_cmpl_unit -
      char  eye{8};                     /* Eye catcher: "CMPLUNIT". */
      char  stmt{MAX_STMT_LEN};         /* Text of this statement. */
      SQLNN_SAP_SCOPE
            *scope;                     /* Pointer to the containing scope. */
      long  no_of_var_ref;              /* # of distinct local var. ref. */
      long  no_of_var_upd;              /* # distinct local var. upd. */
      SQLNN_SAP_SYM_ENTRY *var_ref_map{MAX_VAR_REF};
                                        /* Sym. ID of the referenced vars. */
      SQLNN_SAP_SYM_ENTRY *var_upd_map{MAX_VAR_REF};
                                        /* Sym. ID of the updated vars. */
      struct sqlri_shd
            *section_ptr;               /* Pointer to the executable plan.*/
      long  section_len;                /* Length of the executable plan.*/
"     SQLNN_SAP_CMPL_UNIT,    *SQLNN_SAP_CMPL_UNITP;
```

```
enum sap_ast_type -
    /* SAP statements. */
    SAP_COMPOUND_STMT_AST,
    SAP_SET_STMT_AST,
    SAP_DECLARE_STMT_AST,
    SAP_IF_STMT_AST,
    SAP_WHILE_STMT_AST,
    SAP_REPEAT_STMT_AST,
    SAP_LOOP_STMT_AST,
    SAP_LEAVE_STMT_AST,
    SAP_SQL_STUB_AST,
    /* Elements of SAP statements. */
    SAP_VAR_ENTRY_AST,
    SAP_AUTOMATIC_SPEC_AST,
    SAP_STMT_LABEL_AST,
    /* Aux. ast type. */
    SAP_AST_LIST_AST,
    SAP_AST_LIST_HEAD_AST,
    /*!!!!!!!!!!!!!!!!!!!!!!!!!!!!!!!!!!!!!!!!!!*/
        /* Put new statement type before this line. */
    /*!!!!!!!!!!!!!!!!!!!!!!!!!!!!!!!!!!!!!!!!!!*/
    SAP_INVALID_AST
    ";
typedef struct sqlnn_sap_ast_header -
    enum sap_ast_type        ast_type;   /* Statement type.*/
"   SQLNN_SAP_AST_HEADER,   *SQLNN_SAP_AST_HEADERP;
```

The PGM List Structure

In PGM, there are cases where a parent node may have a list of child nodes of a certain kind (e.g. the list of compound statements). Therefore, there is a "list head" node and the "list" node for the representation of a heterogeneous list. The following C definitions implement the design.

statements, and an ending label. All of these syntactic components are optional and are represented by pointers to the corresponding structures. The following C code defines the structures that correspond to the compound statement and its sub-components.

```
typedef struct sqlnn_sap_ast_list -
    SQLNN_SAP_AST_HEADER
            header;     /* common AST structure. */
    void   *this_ast;   /* Current list member. */
    struct /* Rest of the list. */
           *next_ast;   /* Rest of the list. */
"   SQLNN_SAP_AST_LIST, *SQLNN_SAP_AST_LISTP;
typedef struct sqlnn_sap_ast_list_head -
    SQLNN_SAP_AST_HEADER
           header;      /* common AST structure. */
    SQLNN_SAP_AST_LIST   *first_ast;  /* Head of the list.*/
    SQLNN_SAP_AST_LIST   *last_ast;   /* Tail of the list. */
"   SQLNN_SAP_AST_LIST_HEAD *SQLNN_SAP_AST_LIST_HEADP;
```

The PGM Structures for Compound Statement

A compound statement consists of a label, an atomic specification, a list of local declarations, a list of SQL3

```
typedef struct sqlnn_sap_cmpd_stmt_header_ast -
    SQLNN_SAP_AST_HEADER
            header;     /* common AST structure */
    char   *label;      /* statement label. */
"   SQLNN_SAP_STMT_LABEL, *SQLNN_SAP_STMT_LABEL_ASTP;
typedef struct sqlnn_sap_automatic_spec_ast -
    SQLNN_SAP_AST_HEADER
            header;     /* common AST structure. */
    char    automatic;  /* 'Y': automatic 'N': non-automatic */
"   SQLNN_SAP_AUTOMATIC_SPEC_AST, *SQLNN_SAP_AUTOMATIC_SPEC_ASTP;
typdef struct sqlnn_sap_cmpd_stmt_ast -
    SQLNN_SAP_AST_HEADER
            header;     /* common AST structure. */
    SQLNN_SAP_STMT_LABEL_AST
            *stmt_header;   /* beginning label */
    SQLNN_SAP_AUTOMATIC_SPEC_AST
            *auto_spec;     /* "automatic" specification. */
```

-continued

```
    SQLNN_SAP_AST_LIST_HEAD
        *local_decl;    /* List of local declarations. */
    SQLNN_SAP_AST_LIST_HEAD
        *stmts;         /* List of procedure statements. */
    SQLNN_SAP_STMT_LABEL_AST
        *stmt_trailer;/* ending label */
    SQLNN_SAP_SCOPE
        *scope;         /* Scope introduced by this statement. */
"   SQLNN_SAP_CMPD_STMT_AST, *SQLNN_SAP_CMPD_STMT_ASTP;
```

The PGM Structures for Declare Statement

A declare statement declares a list of local objects (variables, tables, views, etc). Only local variable declaration is supported at this point. A local variable declaration statement consists of a list of variables, an optional constant specifier, a type specification, and an optional initializer. The following C code defines structures which corresponds to the representation of the declare statement, the variable declaration statement, and the sub-components of the variable declaration statement.

The PGM Structures for If Statement

An IF statement consists of 2 subtrees. The first subtree consists of the statements in the body of the THEN part of the IF statement. The second one consists of the statements in the body of the ELSE part of the IF statement.

```
typedef struct sqlnn_sap_var_ast -
    SQLNN_SAP_AST_HEADER
            header;    /* common AST structure. */
    char    *namep;    /* name of the variable. */
    long    name1;     * name length. */
    SQLNN_SAP_SYM_ENTRY
            *symref;   /* pointer to the symbol table entry */
"   SQLNN_SAP_VAR_AST, *SQLNN_SAP_VAR_ASTP;
typedef struct sqlnn_sap_const_or_updatable_ast -
    SQLNN_SAP_AST_HEADER
            header;    /* common AST structure. */
    char    storage_class    /* 'C': constant  'U': updatable. */
"   SQLNN_SAP_CONST_OR_UPDATABLE_AST,
            *SQLNN_SAP_CONST_OR_UPDATABLE_ASTP;
typedef struct sqlnn_sap_var_dcl_ast -
    SQLNN_SAP_AST_HEADER
            header;    /* common AST structure. */
    SQLNN_SAP_AST_LIST_HEAD
            *var_list; /* AST structure for the list of variables.*/
    SQLNN_SAP_CONST_OR_UPDATABLE_AST
            *var_class;    /*storage class of var: constant/updatable.*/
    class   sqlnn_dat_TYPTYPE
            *var_type; /* data structure for the declared type. */
"   SQLNN_SAP_VAR_DCL_AST, *SQLNN_SAP_VAR_DCL_ASTP;
typedef struct sqlnn_sap_decl_ast -
    SQLNN_SAP_AST_HEADER
            header;    /* common AST structure. */
    SQLNN_SAP_AST_LIST_HEAD
            *decls;    /* List of declarations. */
"   SQLNN_SAP_DECL_AST, *SQLNN_SAP_DECL_ASTP;
```

```
typedef struct sqlnn_sap_if_stmt_ast -
    SQLNN_SAP_AST_HEADER
            header;    /* common AST structure */
    ULINT   boolean_stub;  /* index to the cmpl_unit which
                                            contains the stub corresponding
                                            to the condition expression */
    SQLNN_SAP_AST_LIST_HEAD
            *then_stmts;  /* List of stmts in IF-THEN part */
    SQLNN_SAP_AST_LIST_HEAD
            *else_stmts;  /* List of stmts in ELSE part */
    ULINT   jmp_then_Xx;   /* Offset to jump forward ptr (tcg) */
    ULINT   jmp_else_Xx;   /* Offset to jump else ptr (tcg) */
    ULINT   jmp_leave_Xx;  /* Offset to then next stmt (tcg) */
"   SQLNN_SAP_IF_STMT_AST, *SQLNN_SAP_IF_STMT_ASTP;
```

The PGM Structures for loop Statement

This structure is used to represent a loop statement. The loop statement here can be a WHILE loop, a REPEAT-UNTIL loop or a forever LOOP. The loop_type field indicates what kind of loop statement this structure is representing.

```
typedef struct sqlnn_sap_loop_stmt_ast -
    SQLNN_SAP_AST_HEADER
        header      /* common AST structure */
    SQLNN_SAP_STMT_LABEL_AST
        *stmt_header;   /* beginning label */
    SQLNN_SAP_AST_LIST_HEAD
        *body_stmts;    /* List of stmts in loop body */
    ULINT   boolean_stub;  /* index to the cmpl_unit which
                              contains the stub corresponding
                              to the loop condition expression.
                              0 if loop_type is forever loop */
    SQLNN_SAP_STMT_LABEL_AST
        *stmt_trailer;  /* ending label */
    ULINT   loop_type;  /* SAP_WHILE_STMT_AST: While loop,
                           SAP_REPEAT_STMT_AST: Repeat loop,
                           SAP_LOOK_STMT_AST: Forever loop */
    ULINT   beg_loop_Xx; /* Offset to 1st STUB stmt (tcg) */
    ULINT   end_loop_Xx; /* Offset to last STUBS stmt (tcg)
*/
"   SQLNN_SAP_LOOP_STMT_AST, *SQLNN_SAP_LOOP_STMT_ASTP;
```

The SAP Structure for Leave statement
    This structure is used to represent a LEAVE statement.

```
typedef struct sqlnn_sap_leave_stmt_ast -
    SQLNN_SAP_AST_HEADER
        header;     /* common AST structure */
    char    *label;     /* leave label */
    SQLNN_SAP_LEAVE_STMT_AST
        *next_leave_ast; /* Next leave operator entry (tcg) */
    ULINT   oprXx;      /* offset to the leave operator (tcg) */
"   SQLNN_SAP_LEAVE_STMT_AST, *SQLNN_SAP_LEAVE_STMT_ASTP;
```

The PGM Structures for Query Statement

As described earlier in this section, the pre-processor replaces a query statement, compiler-generated or original, with a special SQL_STUB token. SQL_STUB represents a placeholder for the corresponding query statement whose syntactic and semantic information are stored in a sap_cmpl_unit control block. In the PGM structure for SQL_STUB, the pointer to the corresponding sap_cmpl_unit structure is used as the linkage between the SAP skeleton and the extracted query statement. The following C code demonstrates the definition of the PGM structure for a query statement.

```
typedef struct sqlnn_sap_sql_stub_ast -
    SQLNN_SAP_AST_HEADER
        header;     /* common AST structure. */
    SQLNN_SAP_CMPL_UNIT
        *stub_cbp; /* pointer to the corresponding SQL STUB
control block. */
"   SQLNN_SAP_SQL_STUB_AST, *SQLNN_SAP_SQL_STUB_ASTP;
```

Scope and Symbol Table

A scope structure contains the scope level, the scope name, the pointer to the symbol table, and the pointer to the parent scope as shown by the following C definition.

```
typedef struct sqlnn_sap_scope -
    short   scope_level;    /* nested level of the scope */
    char    *scope_name;    /* name of the scope */
```

-continued

```
struct   sqlnn_sap_sym_entry
         *symtab;       /* symbol table */
```

-continued

```
struct   sqlnn_sap_scope
         *parent_scope;  /* pointer to the parent scope */
"   SQLNN_SAP_SCORE, *SQLNN_SAP_SCOPEP;
```

In the current implementation, a symbol table is a list of symbol entries. The information stored in the symbol entry, sqlnn_sap_sym_entry, is described as follows. For better performance, other symbol table schemes such as a binary tree, an AVL tree, or a hash table could be chosen without affecting the symbol table entry structure.

```
typedef struct sqlnn_sap_sym_etnry -
    char    *namep;         /* local variable name */
    long    name1;          /* len of variable name */
    long    varid;          /* local variable id */
    class   sqlnn_dat_TYPTYPE
            *var_type;      /* type structure used in SQNQ */
    struct  sqlz_value
            *value;         /* structure used in SQNQ and SQNG */
```

```
   char    var_class;       /* storage class of the variable */
   char    reserved1{3};
   struct  sqlrahvm
           *hvar;            /* coresponding host var. entry */
   struct  sqlnn_sap_sym_entry
           *next_sym;       /* next local var in the scope */
   struct  sqlvar
           *sap_var;        /* pointer to the SAP_VAR object */
" SQLNN_SAP_SYM_ENTRY, *SQLNN_SAP_SYM_ENTRYP;
``` namep
  Name of the symbol.
namel
  Length of the symbol name.
varid
  The symbol ID which uniquely identifies the symbol in the control statement.
var_type
  Pointer to the type structure processed by the compiler.
value
  Pointer to the structure representing the initial value of the symbol.
var_class
  The storage class of the symbol, constant or updatable.
hvar
  Pointer to the host variable table entry.
next_sym
  Pointer to next symbol in the symbol table.
sap_var
  Pointer to the threaded code object allocated for this symbol.
Copyright IBM Corporation 1995
Other Design Aspects
  The present system, method and computer programming of this invention have been described with reference to a subset of the SQL3 control statements in order to illustrate the design of the present invention in supporting SQL3 control statements in a SQL2-based query compiler. The following is a discussion of other aspects of the design for consideration in other embodiments or enhanced embodiments of the present invention.
Type Casting Rules
  Host variables and local variables behave in the same way except in some context where implicit type casting is involved. As an example, let :hv be an host variable of type integer, lv be a local variable of type smallint, and c_udt be a column of table tb whose type is a float-based user-defined type. Since the typing rule on local variables, which is the same rule as on table columns, is stricter than that of host variables, the following statements will behave differently:

```
UPDATE  tb  SET  c_udt = lv
UPDATE  tb  SET  c_udt = :hv
```

The first one will fail to compile because the type mismatch. However, the second one will run successfully with an implicit cast function inserted to cast the host variable to the base type of the assignment target.
  Since local variables are mapped into host variables, a special flag is needed to distinguish local-variable-mapped host variables from the normal host variables.
Catalog Service and Plan Manager
  With the introduction of meta-plan, an execution plan could contain other execution plans as components. As a consequence, several enhancements need to be made in the area of catalog service and plan manager:

Storing/Loading the Meta-Plan
  All the sub-plans of a meta-plan is chained through a new field in the plan header. The catalog service routine has to take this into consideration and store/load all the sub-plans accordingly.
Relocating the Meta-Plan
  Similarly, the plan initialization routines need to take care of the relocation of the relocatable offsets in the sub-plans of a meta-plan. This can be done by following the chain of sub-plans and repeatedly relocate each sub-plan using the current logic for an ordinary plan.
Cursors Declared in Host Program
  In the V2 compiler, declaration and reference of a cursor is processed in a way which involves the collaboration between the pre-processor and the SQL compiler. The SQL statement associated with the cursor is compiled into an execution plan by the SQL compiler. The pre-processor maintains the mapping between the cursor name and the execution plan. Reference to the cursor in an open statement or a fetch statement is translated into an invocation to some API with the plan ID passed as a parameter.
  To support cursor fetch in a control statement, the RDS component can be extended with a new service request, add cursor, for the pre-processor to inform the SQL compiler of the mapping between the cursor name and the corresponding execution plan. The add cursor request should work in the same way as the add host variable request. With such an extension to RDS, the code synthesizer will generate a special op-code for the fetch statement. At run time, the special op-code will be interpreted as an execute plan instruction and will cause the corresponding plan to be executed. At its completion, the original meta-plan will be resumed to continue the execution.
Performance Consideration
  Several improvements on this design have been identified. First of all, the pre-processor and the new compiler path could be merged in a single parsing phase; syntax tree of the skeleton and the symbol table can be generated on the fly when the source statement is being transformed. Another area where performance could be improved is the code synthesizer and the new run time routines.
Global Optimizations
  Control statements may provide the compiler with better information for query optimization. For example, because of the compound statement, multiple-query optimization (See, Timos K. Sellis, Multiple-Query Optimization, ACM Transaction on Database Systems, 13(1):23–52, March 1988) becomes possible and can be important. Let Emp be a table with five columns: name, emp_num, age, job, and dept_name. Let Dept be a table with columns name and num_of_emp. The following queries can be optimized in a way such that fewer temporary tables are generated.

```
BEGIN
    DECLARE c1 CURSOR FOR
        SELECT * FROM Emp, Dept WHERE Emp.dept_name =
                    Dept.name AND
                    Emp.age <= 50 AND
                            Dept.num_of_emp <= 20;
    DECLARE c2 CURSOR FOR
        SELECT * FROM Emp, Dept WHERE Emp.dept_name =
Dept.name AND
                            Emp.age <= 40 AND
                            Dept.num_of_emp <= 30;
    OPEN c1;
    OPEN c2;
loop1: LOOP
        FETCH c1 INTO . . . ;
```

```
        IF ( . . . ) THEN LEAVE loop1;
        . . .
        END LOOP loop1;
        /* No insert, update, or delete on Emp and Dept. */
        . . .
loop2: LOOP
        FETCH c2 into . . . ;
        IF ( . . . ) THEN LEAVE loop2;
        . . .
        END LOOP loop2;
        . . .
    END
```

Taking the advantage of the control flow information, the compiler will generate two temporary tables shared by c1 and c2:

```
SELECT * FROM Emp WHERE age <= 50;
SELECT * FROM Dept WHERE num_of_emp <= 30;
```

To support such kind of global optimization, two changes need to be made in the above described preferred embodiment. First of all, the control flow analysis has to be made while the skeleton is being parsed. Second, the query compiler and the code synthesizer have to work interactively to come up with a better execution plan.

In this section, an extension to the base architecture to support global optimization is described. The extension is a result from considering the kind of program information that can benefit the optimizer, and from considering how the control flow graph can be used to provide the above global program information.

Consider the control flow graph where each query node is associated with some local properties about the query. There are two kinds of global information that can be useful. One is the inter-query information. For example, the optimizer can benefit from the global information that query q1 and query q2 access the same table with subsumption predicates. The other kind of information available is the control context of a query. For example, if a query is inside a loop, the optimizer may decide to generate a temporary index for accessing a referenced table in the query at the loop entry and discard it at the loop exit.

Figure 25:
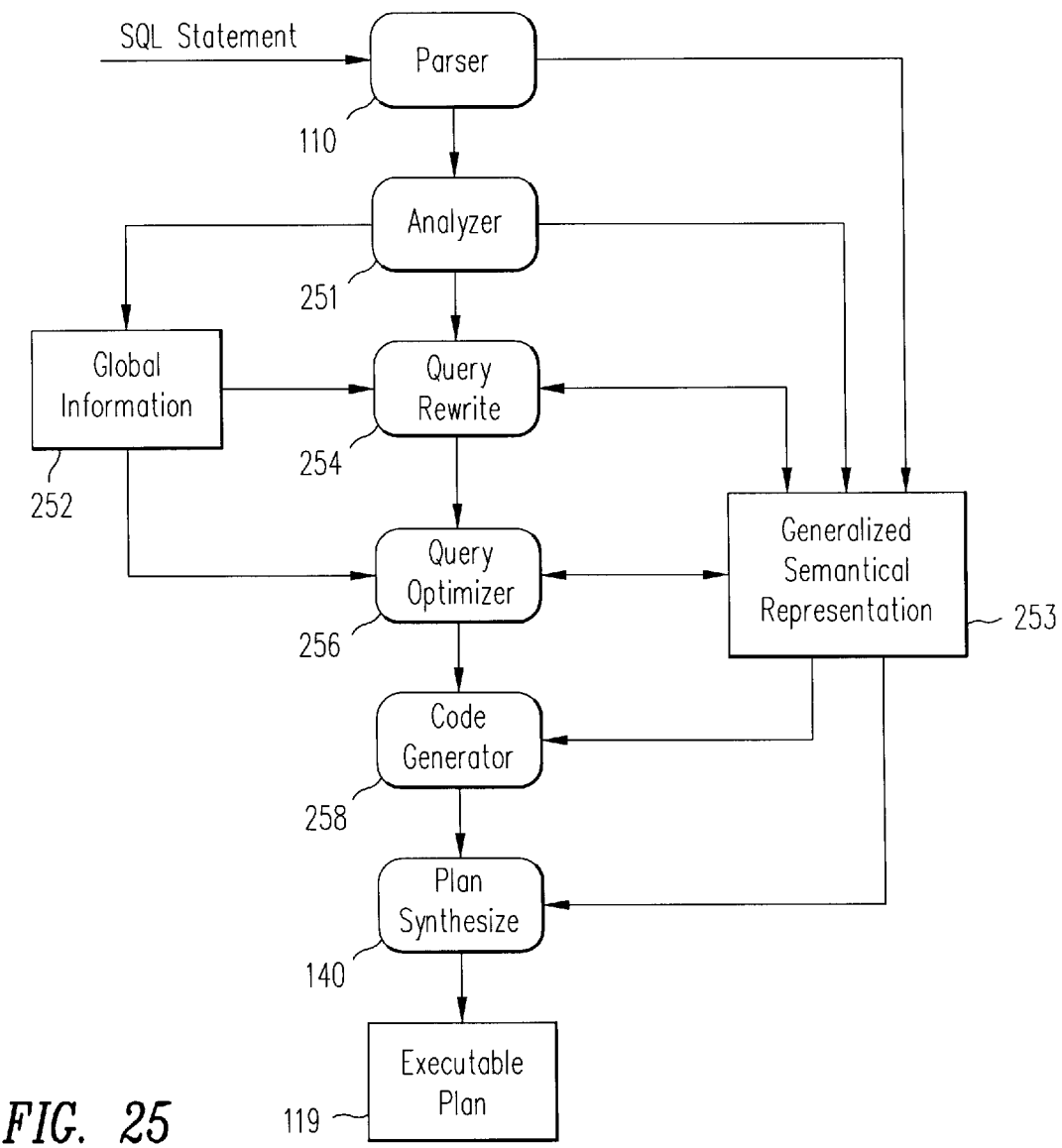
FIG. 25 illustrates the compiler architecture that extends the base architecture for global optimization.

FIG. 25 shows the compiler architecture that extends the base architecture for global optimization. A new component, analyzer 251, is added before the rewrite component 254. It analyzes the whole program and derives global program properties 252 that can be used in rewrite 254 and optimizer 256. The following is a description of some global information and how it can be used to generate better a plan.

The readset of a query q is defined to be the set of tables that q reads, and the writeset is defined to be the set of tables that q modifies (inserts/updates/deletes or creates). Following the conventional terminology in dependency analysis (Hans Zima and Barbara Chapman, *Supercompilers for Parallel and Vector Computers*, ACM Press, 1991), two queries q1 and q2, where q1 is executed before q2, is table dependent if

```
writeset(q1)^readset(q2) <> _      //flow dependent
or readset(q1)^writeset(q2) <> _   //anti dependent
or writeset(q1)^writeset(q2) <> _  //output dependent
```

As an example, let courses(num,studentID,score) be a table of course number, student id, and the student's score in the course. Consider the following sequence of queries that creates the table honor consisting of students that score 100 in some course and do not fail in any course, and the table dropout consisting of students that do not pass any course.

```
S1: INSERT INTO fail SELECT studentsID, num FROM courses
        WHERE score<60;
S2: INSERT INTO pass SELECT studentsID, num FROM courses
        WHERE score>=60;
S3: INSERT INTO honor SELECT courses.studentsID FROM courses
        WHERE score=100 AND courses.studentsID NOT IN
                            (SELECT studentsID FROM
                             fail);
S4: INSERT INTO dropout SELECT fail.studentsID FROM fail, pass
        WHERE fail.studentsID NOT IN (SELECT studentsID
        FROM Pass);
```

Figure 26:
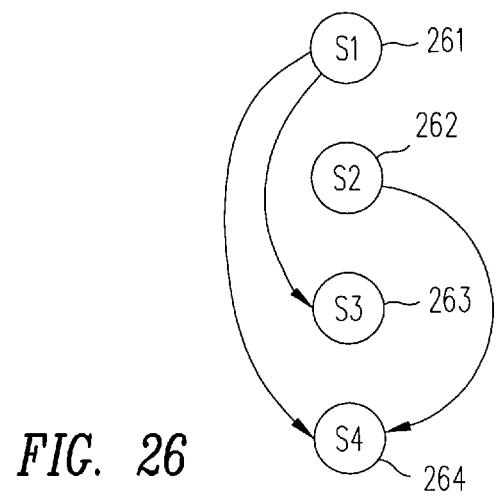
FIG. 26 illustrates table dependencies.

The sets are as follows:

```
readset(S1)={courses}        writeset(S1)={fail}
readset(S2)={courses}        writeset(S2)={pass}
readset(S3)={courses,fail},  writeset(S3)={honor}
readset(S4)={fail,pass},     writeset(S4)={dropout}
``` and their table dependencies are shown in FIG. 26, where a directed arc from q1 to q2 denotes a dependency (in this case, all are flow dependencies). Table dependency dictates the execution order of queries. FIG. 26 indicates that S1, 261 and S2, 262 can be executed in any order (or even in parallel), while S3, 263 must be executed after S1, 261, and S4, 264, must be executed after S1 and S2. Note that the same dependency analysis applies if the compiler can break the query into more primitive operations to obtain finer dependency information.

Next, it is important to analyze queries that access some common table, so that these queries can be optimized together. For example, if query q1 and query q2 both read table T but with different predicates, the optimizer may decide to choose a plan not considered before when each query is optimized independently, but achieves better overall performance. Similarly if a query q1 appears in a loop, the optimal plan for q1 may be different from the one if q1 is considered in isolation.

In general, to generate a globally optimized plan, the optimizer must have a good cost model that also take into account the surrounding context. To focus on hot spots in the program, a frequency can be associated with each edge in the control flow graph. This frequency approximates how many times the edge will be executed. For a loop that iterates over a table, the frequency can be approximated by the number of rows in the table; for other loops, some constant, e.g., 100, can be used instead. For conditionals, the frequency of each branch is in proportion to its probability (another heuristic parameter). When the optimizer enumerates different plans for a query, there can be other alternative plans that are not considered before, for example, whether to sort, generate a temporary table or generate a temporary index (each is associated with different cost). Then with the frequencies, the optimizer chooses the plan with the lowest cost. For example, consider the program in section 1. Since the statement:

```
SELECT MIN(price) INTO quote`low FROM competitor`quote
        WHERE part`no = my`part;
``` is in a loop, the plan enumeration may determine that a temporary index of competitor_quote on the columns (part_no,price) results in the lowest cost, so the optimizer chooses the plan and creates the required temporary index at the loop entry. Furthermore, since there is no more live use of the temporary index after the loop, the index can be discarded at the loop exit.

As demonstrated so far, this architecture can borrow many existing analysis, optimization and parallelization techniques that have long been used in imperative languages. More importantly, what has also been demonstrated in this architecture is that global optimization is achieved with relatively little impact on the existing query compiler. These advantages can be easily demonstrated by the following compiler driver which is based on the compiler architecture shown in FIG. 25.

```
analyze(G);
for each query node n in the control flow graph G {
    global_rewrite(n);
    global_optimize(n);
    code_gen(n);
}
plan_synthesize(G);
```

Analyze(G) 251 performs the statical analysis on the control flow graph 253. It will associate each edge of the control flow graph with a cost measuring the frequency of the execution of the corresponding node (the tail of the edge). The table dependency graph is also constructed based on the readset and the writeset of each individual SQL92 statement which are obtained during the semantical phase of the parser component. Global_rewrite(n) and global_optimize(n) are the extended query rewriter 254 and query optimizer 256 respectively which takes into consideration the global information derived by the analyzer to direct the application of rewrite rules and selection of optimal plans. Finally the plan_synthesizer(G) 140 synthesizes the final plan from the optimal plans selected by the global optimizer 256.

Using the foregoing specification the invention may be implemented using standard programming and/or engineering techniques. The resulting program(s), having computer readable program code means, may be stored on a computer usable memory such as disk, diskettes, memory cards ROM, tape, CD ROM, or any other memory device, or transmitted over a communication link. For execution, the program may be copied into the RAM of the computer. User input may be received from the keyboard, mouse, pen, voice, touch screen, or any other means by which a human can input data to a computer, including through other programs such as application programs. One skilled in the art of computer science will easily be able to combine the software created as described with appropriate general purpose or special purpose computer hardware to create a computer system embodying the invention and to create a computer system for carrying out the method of the invention. While the preferred embodiment of the present invention has been illustrated in detail, it should be apparent that modifications and adaptations to that embodiment may occur to one skilled in the art without departing from the scope of the present invention as set forth in the following claims. This includes, but is not limited to, an embodiment of the invention embodied in a computer system wherein the application, user, storage devices, and compilers, and/or components thereof, are all or partly remote from each other and connected via a communication link.

The data structures, routines, and code sequences described in the drawings and the body of the description are subject to the following copyright:
Copyright IBM corporation 1995

We claim:

1. A system for compiling a database language statement having a procedural part packaged together with at least one declarative part, the system comprising:

a query extractor for separating the procedural part from the declarative part whereby the procedural part, separated from the declarative part, is a control skeleton;

an integrated compiler having a query compiler and a control analyzer wherein said control analyzer is specialized for compiling the procedural part;

the query compiler compiling the at least one declarative part and generating an executable plan;

the control analyzer generating a control flow representation of control flow information of the control skeleton; and a plan synthesizer for synthesizing the output from the query compiler and the control analyzer by merging a code sequence generated from the control flow information of the control skeleton with the executable plan.

2. The system of claim 1 wherein the control skeleton comprises the procedural part of the database language statement and a token in place of the declarative part.

3. The system of claim 1 wherein the control flow representation preserves a semantic of the database language statement.

4. The system of claim 1 wherein the query extractor resides in a parser of the query compiler.

5. The system of claim 1 wherein the query compiler generates a representation of the declarative part independently from the control skeleton.

6. The system of claim 1 wherein the query compiler performs a name resolution function to determine a meaning of a local variable and invokes a symbol table look up routine to return a host variable name to a semantic routine of the query compiler if the name resolution function fails to find a column name.

7. The system of claim 1 further comprising at least one scope and a symbol table into which said control skeleton is fed for resolving local variables declared inside a compound statement used to create the scope.

8. The system of claim 1 wherein the control analyzer generates at least one scope and a symbol table from the control skeleton, populates a host variable table with each local variable, and populates an outer-most symbol table with each host variable.

9. The system of claim 8 wherein the query compiler handles all variables through the host variable table populated with host variables and local variables and a code generator allocating storage for the host and local variables from the symbol table.

10. The system of claim 1 wherein the plan synthesizer emits a global bind-in operator at the beginning of the executable plan to move host variable values into a SQL runtime.

11. The system of claim 1 wherein the plan synthesizer emits a global bind-out operator at the end of the executable plan to move host variable values out of a SQL runtime.

12. The system of claim 7 wherein the plan synthesizer utilizes information from the at least one scope, the symbol table, the control flow information and each executable plan for generating the meta-plan.

13. The system of claim 1 further comprising a global optimizer applying a procedural language optimization technique to the control skeleton sequence whereby the at least one declarative part is treated as a black box with certain characteristics.

14. The system of claim 5 wherein the representation of the declarative part is extended with a set of procedural nodes for the control flow representation.

15. The system of claim 1 wherein the control analyzer generates at least one scope and a symbol table when a compound statement is encountered in the database language statement.

16. The system of claim 1 wherein the control analyzer performs a control flow and data flow analysis for feedback to the query compiler in performing a global optimization.

17. The system of claim 16 wherein the control flow analysis is performed by traversing the control skeleton, and the plan synthesizer and query compiler operate interactively to generate an optimized executable meta-plan.

18. The system of claim 15 wherein the control analyzer utilizes the control flow representation, the at least one scope, and the symbol table to feed back information to the query compiler for global optimization.

19. The system of claim 1 wherein the control analyzer and query compiler operate interactively to perform global optimization.

20. The system of claim 1 wherein the control analyzer unifies local variables and host variables.

21. A system for compiling a database language statement having a procedural part packaged with at least one declarative part, the system comprising:
a parser for separating the procedural part from the declarative part whereby the procedural part, separated from the declarative part, is a control skeleton, and for generating a first representation of the declarative part and a control flow representation of the control skeleton;
an analyzer creating a table dependency graph from each declarative part;
a threaded code generator for generating a code sequence representing the control flow of the control skeleton;
a query rewrite applying rewrite rules to the declarative part based upon information from the analyzer to rewrite a query for each declarative part;
a query optimizer optimizing the code sequence and the plan for the declarative part based upon the information from the analyzer; and
a plan synthesizer synthesizing a final plan from an optimized code sequence and an optimized execution plan from the query optimizer.

22. The system of claim 21 wherein the analyzer associates each edge of the control flow representation with a cost by measuring a frequency of an execution of a corresponding query node in the control flow representation.

23. A system for compiling a database language statement having a procedural part packaged together with at least one declarative part, the database language statement embedded in an application program for querying a database managed by a server, the system comprising:
an integrated compiler having a first compilation path for compiling each declarative part apart from the procedural part and having a second compilation path for processing the procedural part;
a control analyzer, in the second compilation path, for analyzing a control flow of said procedural part; populating a host variable table with local variables, and creating a symbol table of local and host variables;
a query compiler, in the first compilation path for handling all local variables as host variables from the host variable table populated with local variables in compiling each declarative part into an executable plan;
a threaded code generator, in the second compilation path, for generating a threaded code sequence of the control flow of the procedural part;
a plan synthesizer for embedding each executable plan into the threaded code sequence thereby creating a meta-plan, and allocating storage for local and host variables from the symbol table during code generation time;
a run time interpreter recursively executing each execution plan embedded within the threaded code sequence within the meta-plan wherein the meta-plan has one bind-in operator and one bind-out operator for communicating with the application input and output values of local and host variables.

24. A method for compiling a database language statement having a procedural part packaged together with at least one declarative part, said method comprising:
separating the procedural part from the declarative part;
generating, by a query compiler, an executable plan for each of the at least one declarative part;
generating a threaded code sequence based upon control flow information from the procedural part; and
embedding the executable plan for each of the at least one declarative part as a sub plan into the threaded code sequence to create an executable meta-plan.

25. The method of claim 24 wherein the step of separating the procedural part from the declarative part further comprises replacing the declarative part with a token in the procedural part to create a control skeleton.

26. The method of claim 24 further comprising:
invoking, recursively, an interpreter, when a sub plan is encountered at runtime, for an execution of the sub plan.

27. The method of claim 24 further comprising:
populating a host variable table with local variables for use by the query compiler in handling all variables as host variables.

28. The method of claim 27 further comprising:
populating, during a parsing phase, a symbol table with local variables and host variables and allocating storage, during the generation of the threaded code sequence, for the local variables and host variables.

29. The method of claim 28 further comprising:
executing the meta-plan utilizing one bind-in operator and one bind-out operator.

30. The method of claim 24 further comprising:
applying a procedural language optimization technique to the threaded code sequence whereby the at least one declarative part is treated as a black box with a certain characteristic.

31. A method for compiling a database language statement having a procedural part packaged together with at least one declarative part, the method comprising:
separating the database language statement into the procedural part and the declarative part;
utilizing a query compilation path, for the declarative part, for generating an executable plan for each one of the at least one declarative part;
utilizing a second compilation path, separate from said query compilation path, for the procedural part, for generating control flow information and a threaded code sequence based upon the control flow information; and
synthesizing a final execution plan for the database language statement from the threaded code sequence and the executable plan for each one of the at least one declarative part.

32. The method of claim 31 wherein the step of separating the database language statement further comprises:

transforming a SET statement into an equivalent query statement thereby directly translating the procedural part to the declarative part;

extracting a search condition of a procedural part and replacing the search condition with a compiler generated local variable and, based upon the search condition, assigning a first representation for true or a second representation for false to the local variable, thereby creating a pure procedural part; and replacing each declarative part with a token to create a control skeleton for the procedural part of the database language statement.

33. The method of claim 31 wherein the first compilation path and second compilation path interchange information to perform a global optimization technique.

34. A method for compiling a database language statement having a procedural part packaged together with at least one declarative part, the method comprising:

transforming a SET statement into an equivalent query statement thereby directly translating the procedural part to a pure declarative part;

extracting a search condition of a procedural part and replacing the search condition with a compiler generated local variable and, based upon the search condition, assigning a first representation for true or a second representation for false to the local variable, thereby creating a pure procedural part;

replacing each declarative part with a token to create a control skeleton representing the procedural part of the database language statement; and compiling each declarative part through a query compiler and processing the control skeleton separate from the declarative part.

35. A method of compiling a database language statement having a procedural part packaged together with at least one declarative part, the method comprising:

separating the procedural part and the declarative part into a control skeleton and the declarative part;

compiling, through a first compilation path through a query compiler, each declarative part into an execution plan;

generating, separately from said first compilation path, a threaded code sequence representing a control flow of the control skeleton; and synthesizing the threaded code sequence and each execution plan into one meta-plan.

36. A system for compiling a database language statement having a procedural part packaged together with at least one declarative part, said system comprising:

means for separating the procedural part from the declarative part;

means for processing the declarative part through a query compiler to generate an executable plan for each of the at least one declarative part;

means, separate from the query compiler, for analyzing control flow information of the procedural part and generating a threaded code sequence based upon the control flow information; and means for merging the executable plan for each of the at least one declarative part into the threaded code sequence to create an executable meta-plan.

37. The system of claim 36 further comprising means for treating local variables as if they were host variables.

38. The system of claim 37 further comprising:

means for including local variables along with the host variables in a host variable table generated by the query compiler; and means for allocating storage in the meta-plan as a persistent store for allowing values of local variables to exist across multiple declarative parts.

39. A system for compiling a database language statement having a procedural part packaged together with at least one declarative part, said system comprising:

means for separating the procedural part from the declarative part;

means for integrating a compilation of the declarative part in a first compilation path and a processing of the procedural part in a second path;

means, in the first compilation path, for compiling each declarative part into an execution plan;

means, in the second path for generating a threaded code sequence representing a control flow of the procedural part; and means for synthesizing the threaded code sequence and each execution plan into a meta-plan.

40. The system of claim 39 wherein the means for compiling each declarative part further comprises means for treating local variables as host variables.

41. The system of claim 40 wherein the means for treating local variables as host variables further comprises means for populating a host variable table with local variables for use by said means for compiling each declarative part.

42. The system of claim 39 further comprising means for populating a table with both local and host variables during a parsing phase of the database language statement and means for allocating storage for all variables in the table during a generation of code.

43. The system of claim 39 further comprising means for generating one bind-in operator and one bind-out operator for the meta-plan.

44. The system of claim 39 further comprising means for globally optimizing the threaded code sequence.

45. The system of claim 39 further comprising means, in the second path, for performing a control flow analysis of the procedural part and means for feeding the analysis to the means for compiling the declarative part for performing global optimization.

46. A system for compiling a database language statement having a procedural part packaged with at least one declarative part, the system comprising:

means for separating the procedural part from the declarative part into a control skeleton and the at least one declarative part;

means for generating a first representation of the declarative part and generating a control flow representation of a control flow of the control skeleton;

means for performing an analysis on the control flow representation and creating a table dependency graph from each declarative part;

means for generating a code sequence representing the control flow of the control skeleton;

means for applying rewrite rules to the declarative part, based upon information from the means for performing an analysis, for generating a plan for each declarative part;

means for optimizing the code sequence and the plan for the declarative part based upon the information from the means for performing an analysis; and means for synthesizing a final plan from an optimized code sequence and an optimized execution plan from the means for optimizing.

47. An article of manufacture having a computer usable medium having computer readable program code means embodied therein for enabling a compilation of a database language statement having a procedural part packaged together with at least one declarative part, said article of manufacture comprising:

means for enabling a separation of the procedural part from the declarative part;

means for enabling an integrated compilation of the declarative part in a first compilation path and a processing of the procedural part in a second path;

means for enabling, in the first compilation path, a compilation of each declarative part into an execution plan by a query compiler;

means for enabling, in the second path, a generation of a threaded code sequence representing a control flow of the procedural part; and means for enabling a merging of the threaded code sequence and each execution plan into a meta-plan.

48. A system for compiling a database language statement having a procedural part packaged together with at least one declarative part, the system comprising:

means for compiling each declarative part into an executable plan;

means for generating a threaded code sequence of a control flow of the procedural part; and means for embedding each executable plan into the threaded code sequence as a single executable meta-plan.

49. The system of claim 48 wherein the single executable meta-plan has one bind-in operator and one bind-out operator.

50. A method for compiling a database language statement having a procedural part packaged together with at least one declarative part, the method comprising:

compiling each declarative part into an executable plan;

generating a threaded code sequence of a control flow of the procedural part; and embedding each executable plan into the threaded code sequence.

51. An article of manufacture having a computer usable medium having computer readable program code means embodied therein for enabling a compilation of a database language statement having a procedural part packaged together with at least one declarative part, said article of manufacture comprising:

means for enabling a compilation of each declarative part into an executable plan;

means for enabling a generation of a threaded code sequence of a control flow of the procedural part; and means for enabling an embedding of each executable plan into the threaded code sequence as a single executable meta-plan.

* * * * *